US012233007B2

(12) United States Patent
Desjardins et al.

(10) Patent No.: US 12,233,007 B2
(45) **Date of Patent: *Feb. 25, 2025**

(54) PATIENT TRANSPORT APPARATUS WITH ADJUSTABLE HANDLES

(71) Applicant: Stryker Corporation, Kalamazoo, MI (US)

(72) Inventors: Michael Maurice Desjardins, Plainwell, MI (US); Michael T. Brubaker, Portage, MI (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,815

(22) Filed: Jun. 27, 2023

(65) Prior Publication Data

US 2023/0338209 A1 Oct. 26, 2023

Related U.S. Application Data

(63) Continuation of application No. 17/720,733, filed on Apr. 14, 2022, now Pat. No. 11,723,816, which is a (Continued)

(51) Int. Cl.
*A61G 1/013* (2006.01)
*A61G 1/04* (2006.01)
*A61G 1/048* (2006.01)

(52) U.S. Cl.
CPC ............. *A61G 1/013* (2013.01); *A61G 1/048* (2013.01); *A61G 1/04* (2013.01)

(58) Field of Classification Search
CPC . A61G 1/013; A61G 1/02; A61G 1/04; A61G 1/48; A61G 7/1046; A61G 7/053
(Continued)

(56) References Cited

U.S. PATENT DOCUMENTS 5,987,673 A 11/1999 Smith
6,735,794 B1 5/2004 Way et al.
(Continued)

OTHER PUBLICATIONS

Cleaned By Pete, "Cleaned By Pete: What a Power Washer Does Webpage", http://cleanedbypete.blogspot.com/2013/04/extension-or-telescoping-poles-locking.html?_sm_au_=iVV7RSWK6KV8L6RN, Apr. 21, 2013, 5 pages.
(Continued)

*Primary Examiner* — Robert G Santos
(74) *Attorney, Agent, or Firm* — Howard & Howard Attorneys PLLC

(57) ABSTRACT

A patient transport apparatus includes a support structure. The support structure includes a base, a frame, and a patient support surface to support a patient. One or more handle assemblies are coupled to the frame to maneuver the patient transport apparatus. The handle assemblies include one or more handles to be manipulated by a user. The handles are capable of being adjusted to facilitate maneuvering of the patient transport apparatus, such as pushing/pulling the patient transport apparatus along a floor surface, lifting the patient transport apparatus over obstacles, loading the patient transport apparatus into an emergency vehicle, and/or unloading the patient transport apparatus from the emergency vehicle.

20 Claims, 22 Drawing Sheets

Related U.S. Application Data continuation of application No. 17/132,025, filed on Dec. 23, 2020, now Pat. No. 11,324,647.

(60) Provisional application No. 62/954,926, filed on Dec. 30, 2019.

(58) Field of Classification Search
USPC .............. 5/627, 625, 86.1, 81.1 R, 662, 658; 296/20
See application file for complete search history.

(56) References Cited

U.S. PATENT DOCUMENTS

| | | | | |
|---|---|---|---|---|
| 8,056,950 | B2 | 11/2011 | Souke et al. | |
| 8,413,270 | B2 | 4/2013 | Turner et al. | |
| 8,677,535 | B2 | 3/2014 | Turner | |
| 9,510,981 | B2 | 12/2016 | Lambarth et al. | |
| 10,369,063 | B2 | 8/2019 | Matheny et al. | |
| 10,869,791 | B2 | 12/2020 | Matheny et al. | |
| 11,039,965 | B2 | 6/2021 | Rowland et al. | |
| 11,241,345 | B2 | 2/2022 | Brubaker | |
| 11,304,861 | B2 | 4/2022 | Xu et al. | |
| 11,324,647 | B2 | 5/2022 | Desjardins et al. | |
| 11,399,993 | B2 | 8/2022 | Matheny et al. | |
| 11,723,816 | B2 * | 8/2023 | Desjardins | A61G 1/013 5/627 |
| 11,723,818 | B2 * | 8/2023 | Xu | A61G 1/02 5/629 |
| 11,839,572 | B2 * | 12/2023 | Matheny | A61G 5/10 |
| 11,890,235 | B2 * | 2/2024 | Brubaker | A61G 1/048 |
| 2012/0084922 | A1 | 4/2012 | Turner | |
| 2012/0102643 | A1 | 5/2012 | Turner et al. | |
| 2018/0280212 | A1 | 10/2018 | Matheny et al. | |
| 2019/0321244 | A1 | 10/2019 | Matheny et al. | |
| 2020/0000655 | A1 | 1/2020 | Brubaker et al. | |
| 2020/0113752 | A1 | 4/2020 | Rowland et al. | |
| 2021/0030606 | A1 | 2/2021 | Xu et al. | |
| 2021/0069037 | A1 | 3/2021 | Matheny et al. | |
| 2021/0196532 | A1 | 7/2021 | Desjardins et al. | |
| 2022/0117804 | A1 | 4/2022 | Brubaker et al. | |
| 2022/0211559 | A1 | 7/2022 | Xu et al. | |
| 2022/0233367 | A1 | 7/2022 | Desjardins et al. | |
| 2022/0313509 | A1 | 10/2022 | Matheny et al. | |
| 2023/0338209 | A1 * | 10/2023 | Desjardins | A61G 1/013 |
| 2024/0065904 | A1 * | 2/2024 | Matheny | A61G 5/10 |
| 2024/0115439 | A1 * | 4/2024 | Brubaker | A61G 1/013 |

OTHER PUBLICATIONS

Lifetime, "Lifetime 4-Foot Adjustable Fold-In-Half Table (Light Commercial) Webpage", https://www.lifetime.com/lifetime-4428g-4-foot-adjustable-fold-in-half-table-light-commercial, 2020, 6 pages.

* cited by examiner

PATIENT TRANSPORT APPARATUS WITH ADJUSTABLE HANDLES

CROSS-REFERENCE TO RELATED APPLICATIONS

The subject patent application is a Continuation of U.S patent application Ser. No. 17/720,733 filed on Apr. 14, 2022 and issued as U.S. Pat. No. 11,723,816 on Aug. 15, 2023, which is a Continuation of U.S patent application Ser. No. 17/132,025 filed on Dec. 23, 2020 and issued as U.S. Pat. No. 11,324,647 on May 10, 2022, which claims priority to and all the benefits of U.S Provisional Patent Application No. 62/954,926 filed on Dec. 30, 2019, the disclosures of each of which are hereby incorporated by reference in their entirety.

BACKGROUND

Patient transport apparatuses facilitate care of patients in a health care setting. Patient transport apparatuses include, for example, hospital beds, stretchers, cots, wheelchairs, and transport chairs. A conventional patient transport apparatus includes a support structure having a base, a frame, and a patient support surface upon which the patient is supported. The patient transport apparatus may also include a lift device arranged to lift and lower the patient support surface relative to a floor surface. Handles on the frame facilitate maneuvering of the patient transport apparatus.

Occasionally, when the patient support surface has been lowered via the lift device to a lower height, the handles are difficult to reach and/or are difficult to apply leverage to in order to maneuver the patient transport apparatus. Furthermore, users of varying heights may be maneuvering the same patient transport apparatus, which can result in some users grasping and/or otherwise manipulating the handles in awkward ways to maneuver the patient transport apparatus.

A patient transport apparatus with one or more handles designed to overcome one or more of the aforementioned challenges is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
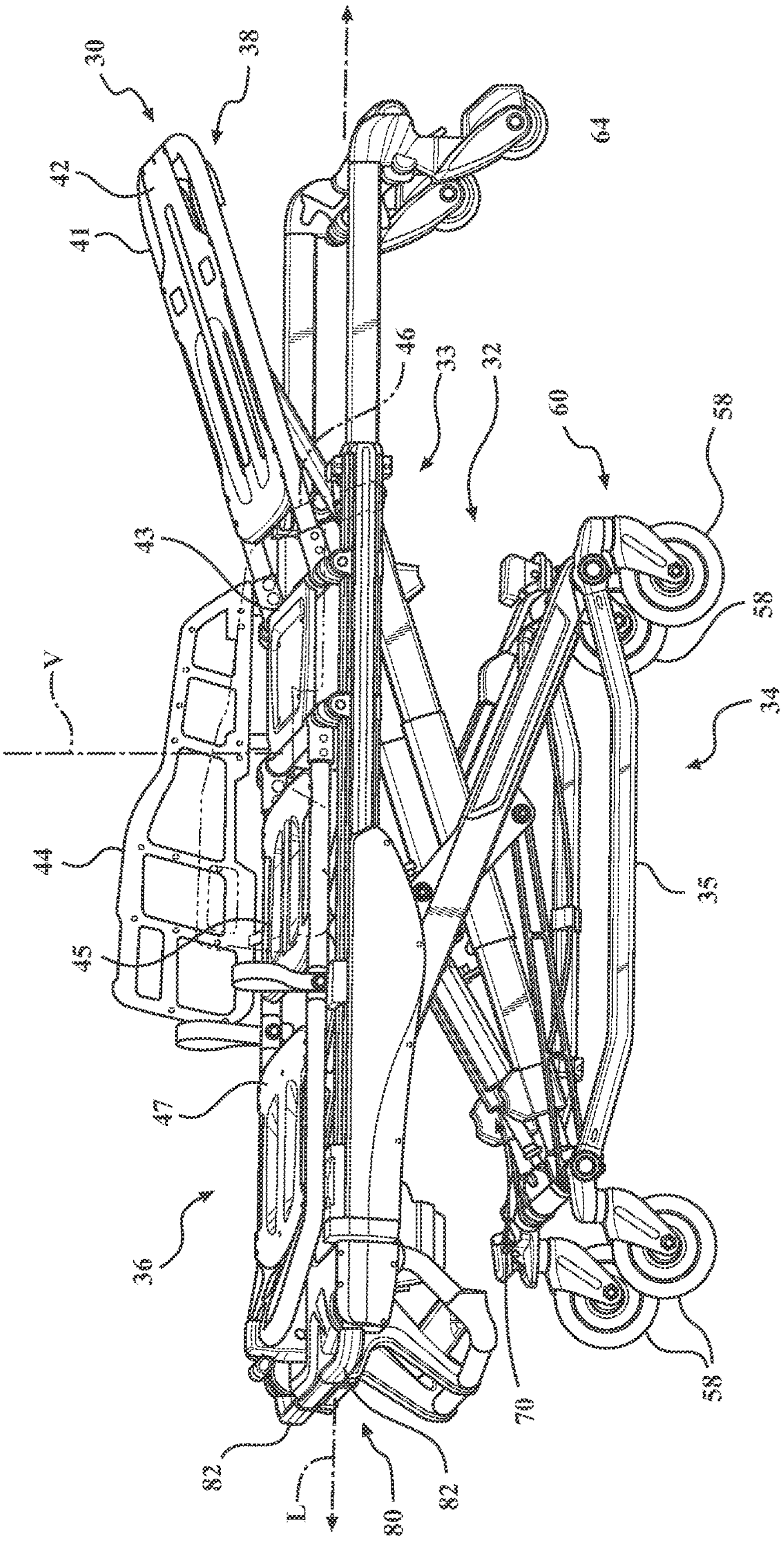
FIG. 1 is a perspective view of a patient transport apparatus with a handle assembly in a retracted position.

Referring to FIG. 1, a patient transport apparatus 30 is shown for supporting a patient in a health care setting. The patient transport apparatus 30 may be a hospital bed, stretcher, cot, wheelchair, transport chair, or similar apparatus utilized in the care of a patient. In the embodiment shown in FIG. 1, the patient transport apparatus 30 is a cot that is utilized to transport patients, such as from an emergency site to an emergency vehicle (e.g., an ambulance).

The patient transport apparatus 30 shown in FIG. 1 includes a support structure 32 that provides support for the patient. The support structure 32 includes a base 34, a support frame 36, and a litter 33. The base 34 may include a base frame 35. The support frame 36 is spaced above the base frame 35. The litter 33 may include a patient support deck 38 disposed on the support frame 36. The patient support deck 38 may include several sections, some of which may be capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 includes a longitudinal axis L along its length from the head end to the foot end. The support frame 36 also includes a vertical axis V arranged crosswise (e.g., perpendicularly) to the longitudinal axis L along which the support frame 36 is lifted and lowered relative to the base 34. The construction of the support structure 32 may take on any known or conventional design, and is not limited to that specifically set forth above. In addition, a mattress (not shown) may be provided in certain embodiments, such that the patient rests directly on a patient support surface of the mattress while also being supported by the patient support surface 42.

Side rails 44, 46 are coupled to the support frame 36 and thereby supported by the base 34. A right side rail 44 is positioned at a right side of the support frame 36. A left side rail 46 is positioned at a left side of the support frame 36. If the patient transport apparatus 30 is a hospital bed there may be more side rails. The side rails 44, 46 may be fixed to the support frame 36, or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

Wheels 58 are coupled to the base 34 to facilitate transport over floor surfaces. The wheels 58 are arranged in each of four quadrants of the base 34 adjacent to corners of the base frame 35. In the embodiment shown, the wheels 58 are caster wheels able to rotate and swivel relative to the support structure 32 during transport. Each of the wheels 58 forms part of a caster assembly 60. Each caster assembly 60 is mounted to the base 34. Various configurations of the caster assemblies 60 are contemplated. One or more of the caster wheel assemblies 60 may include a brake to prevent rotation of its associated caster wheel 58 when engaged. One or more of the caster wheel assemblies 60 may also include a swivel locking mechanism to prevent its associated caster wheel 58 from swiveling when the swivel locking mechanism is engaged. In addition, in some embodiments, the wheels 58 are not caster wheels and may be non-steerable, steerable, non-powered, powered, or combinations thereof. Additional wheels are also contemplated. For example, the patient transport apparatus 30 may include four non-powered, non-steerable wheels, along with one or more powered wheels.

In other embodiments, one or more auxiliary wheels (powered or non-powered), which may be movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheelbase of the patient transport apparatus 30. A fifth wheel may also be arranged substantially in a center of the base 34.

A pair of loading wheels 64 (only one shown, but another is present on the opposite side) may be coupled to the support frame 36 to assist with loading of the patient transport apparatus 30 into the emergency vehicle and unloading of the patient transport apparatus 30 out of the emergency vehicle. In the embodiment shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

The patient transport apparatus 30 may further comprise a lift device 70 configured to raise and lower the patient support surface 42 between minimum and maximum heights relative to the floor surface and intermediate heights therebetween. The lift device 70 may be configured to operate in the same manner, or a similar manner, as the lift mechanisms shown in U.S. Pat. Nos. 8,056,950 or 9,510,981, both incorporated by reference in their entirety herein.

Figure 2:
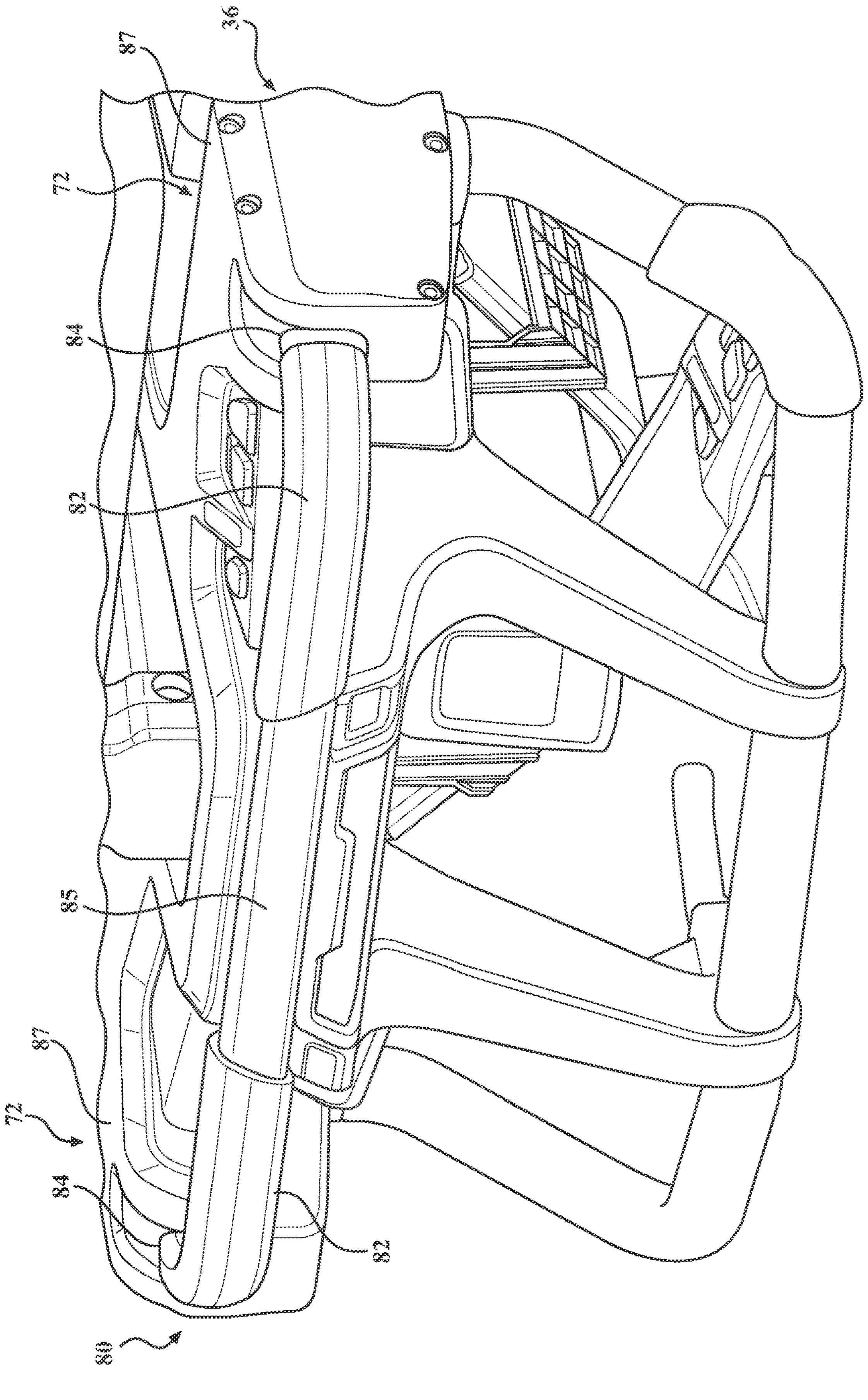
FIG. 2 is a close-up view of the handle assembly of FIG. 1 in the retracted position.

Turning now to FIG. 2, a handle assembly 80 is coupled to the support frame 36. The handle assembly 80 may be located near the foot end, head end, or locations therebetween. The handle assembly 80 is provided to facilitate maneuvering of the patient transport apparatus 30 by providing an operator a readily grasped structure. Such maneuvering includes, for example, pushing and pulling of the patient transport apparatus 30 on its wheels 58 along the floor surface and/or lifting and lowering of the patient transport apparatus 30 over obstacles, such as bumps or curbs, or when the patient transport apparatus 30 is being loaded in or unloaded from the emergency vehicle. In other embodiments, the handle assembly 80 may be attached to the base 34, the patient support deck 38, or any other suitable location on the patient transport apparatus 30. Furthermore, the patient transport apparatus 30 may be equipped with more than one handle assembly 80.

The handle assembly 80 includes one or more adjustable grips 82 configured to be grasped and manipulated by a user to facilitate maneuvering of the patient transport apparatus 30, as described above. In the embodiment shown in FIGS. 2-4B, each of the grips 82 are fixed to a respective handle link 84. A crossbar 85 may be fixed to the grips 82 to space the grips 82 laterally and can also be used as a handle. It should be appreciated that the grips 82 and the crossbar 85 may be integral with the handle links 84 and/or the crossbar 85, may be part of the handle links 84 that are intended to be grasped by users, or may be separate and distinct components that are coupled to the handle links 84. Each of the handle links 84 comprises a shank portion that extends from the grips 82 to a distal end portion 84*a*.

Turning now to FIGS. 3A-4B, the handle assembly 80 is configured to move relative to the support frame 36 from a retracted position (see FIG. 3A) to one or more extended positions (see FIGS. 3B-4B). More specifically, the handle links 84 are able to translate relative to support frame 36 between the retracted position, in which the handle assembly 80 is positioned below the patient support surface 42 and within the footprint of the litter 33, and a first extended position (FIG. 3B), in which at least a portion of the handle assembly 80 is positioned outside the footprint of the litter 33. The links 84 are slidable within rails 72 of the support structure 32 along respective translation axes T (see FIG. 3A) between the retracted position to the first extended position. The rails 72 each define a rail bore 73 aligned with the respective translation axis and extending therethrough. In the retracted position the handle links 84 are at least partially disposed in the rail bore 73. The grips 82 can be grasped and used at the retracted position, the extended position, or any positions therebetween. As discussed further below, the grips 82 may be lockable at the retracted position, extended position, and one or more positions therebetween, and/or may be free to slide.

Figure 3B:
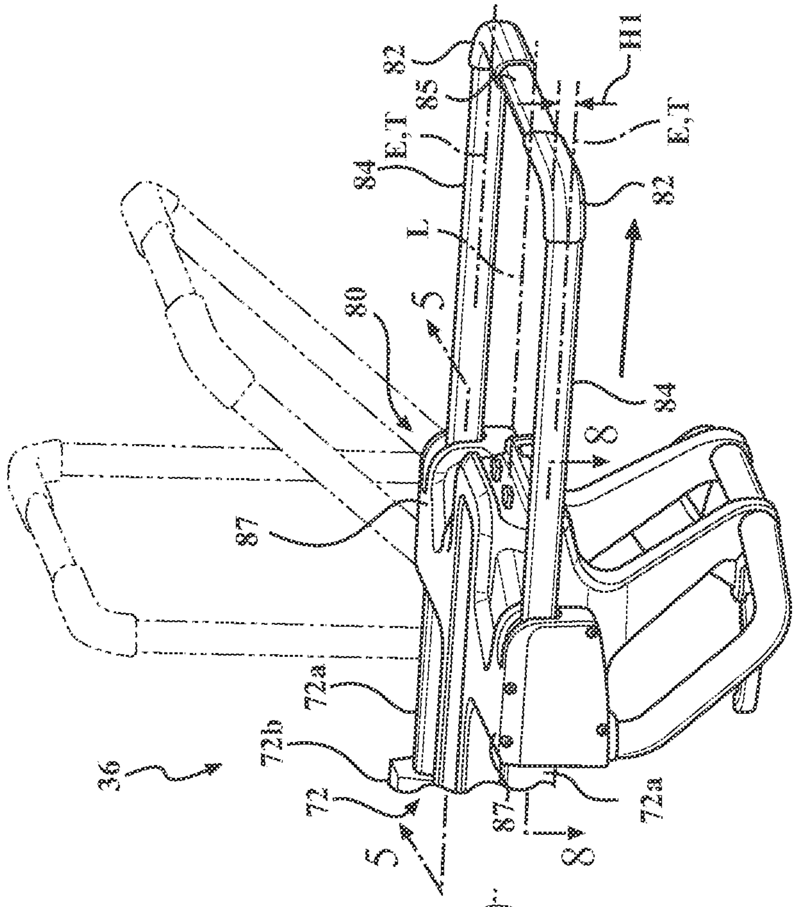
FIGS. 3A and 3B illustrate movement of the handle assembly from the retracted position to a first extended position.
Figure 3A:
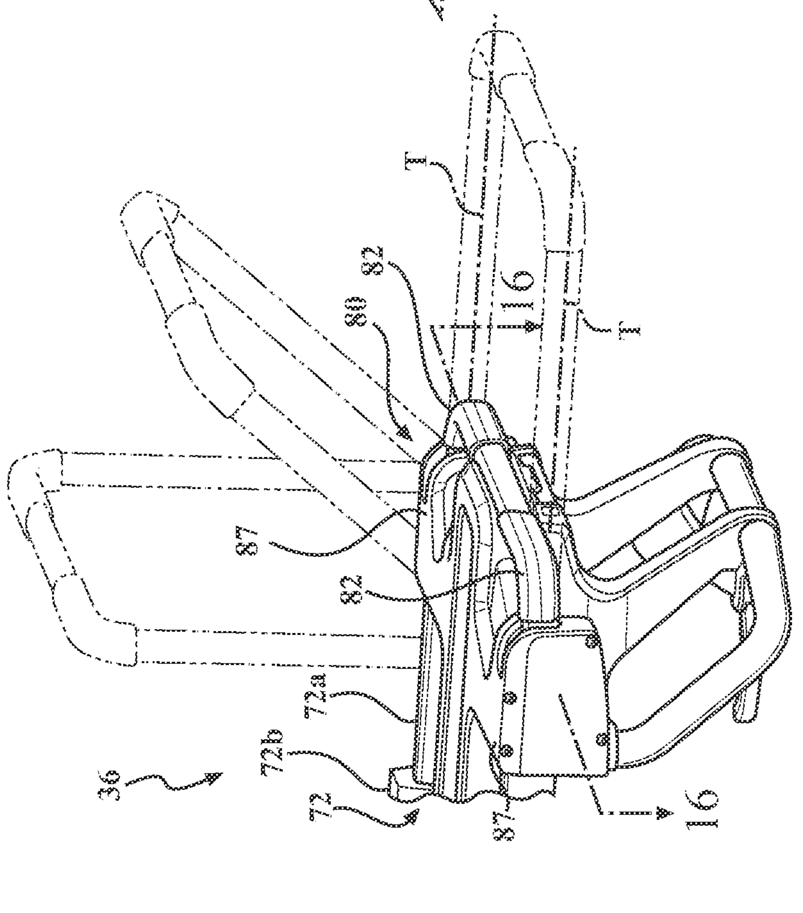

In some versions, the rails 72 are extendible and may include extension rails 72*a* that telescope inside and relative to outer rails 72*b* (see FIGS. 3A and 3B, for example). The extensions rails 72*a* may be configured to lock in a plurality of various extension positions relative to the outer rails 72*b*. The rails 72*a*, 72*b* form part of the support frame 36 in their collapsed and extended configurations. In the embodiment shown, the rails 72 include rail end housings 87 that are fixed to the extension rails 72*a* to extend/retract with the extension rails 72*a* relative to the outer rails 72*b*. A separate release assembly may be employed to actuate a corresponding pair of rail latch assemblies to unlock the rail latch assemblies and allow extension/retraction of the extension rails 72*a* relative to the outer rails 72*b*. The release assembly may include release handles or slides, but could include other forms of release devices, such as levers, buttons, and the like. The release assembly, rails 72*a*, 72*b*, and rail locking devices may be like those shown and described in U.S. Pat. No. 10,369,063, entitled, "Patient Transport Apparatus With Adjustable Handles," which is incorporated by reference herein.

The grips 82 are located adjacent to the support frame 36 in the retracted position (FIG. 3A) and the grips 82 are longitudinally spaced from the support frame 36 by the links 84 in the extended position (FIG. 3B). The grips 82 have various uses in each of the retracted position and the extended position. In the retracted position, the grips 82 are conveniently located close to the support frame 36 so that the patient transport apparatus 30 can be easily moved in an elevator or other tight spaces. The grips 82 can be utilized in the retracted position to lift the patient transport apparatus 30. In the extended position, users maintain additional clearance from patients during transport. Additionally, in the extended position, the grips 82 and handle links 84 freely articulate. This allows users of varying heights to pull the patient transport apparatus 30 via one or more of the grips 82. Other uses of the grips 82 in the retracted and extended positions, and positions therebetween, are also contemplated.

Figure 4B:
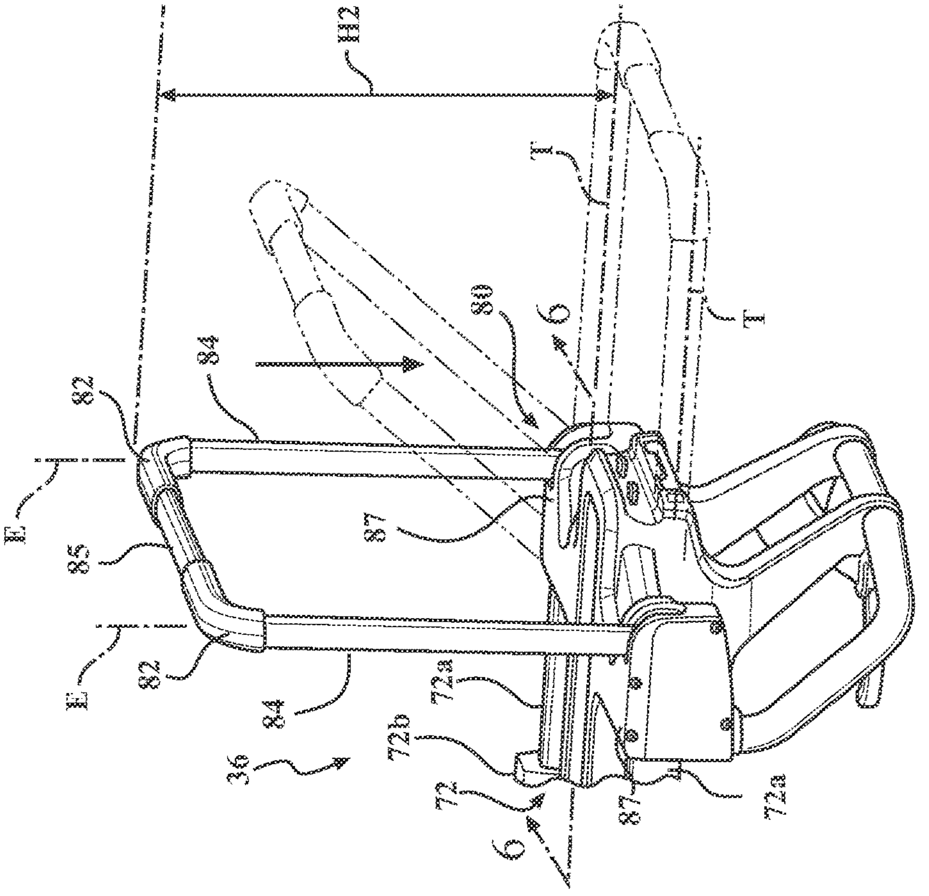
FIGS. 4A and 4B illustrate reorientation of the handle assembly from the first extended position to a second extended position.
Figure 4A:
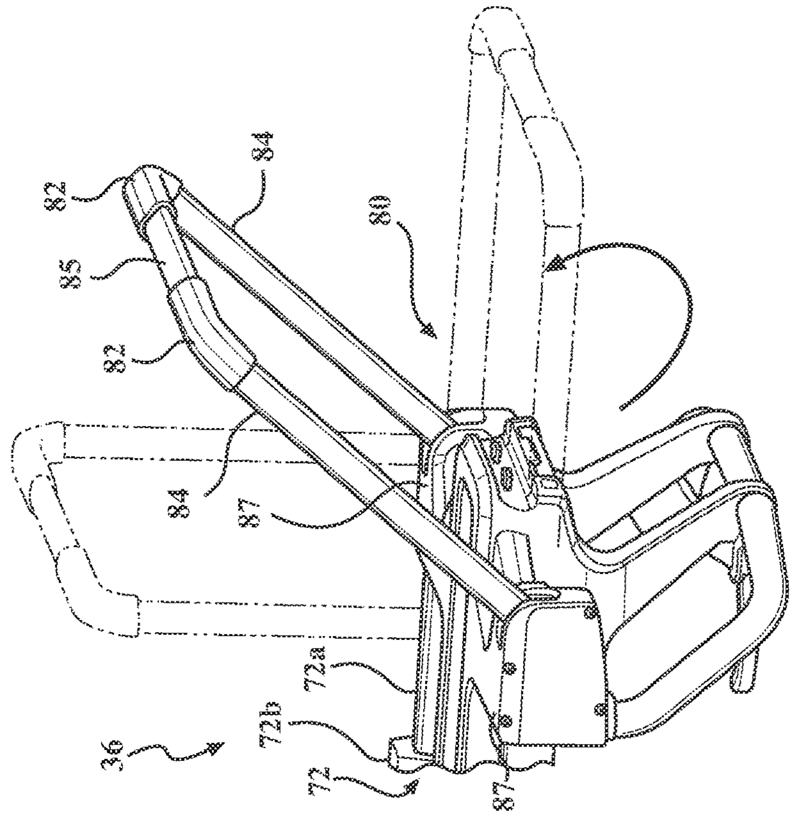

With reference to FIGS. 3A-4B, the handle links 84 may be configured to freely articulate relative to the support frame 36 from a first extended position as shown in FIG. 3B to a second extended position shown in FIG. 4B. In some versions, the first extended position is an orientation in which the handle links 84 are arranged as a first angle relative to a reference axis. For example, the handle links 84 may be parallel to the associated rails 72, and the respective translation axis T, in which they slide. The second extended position is an upright orientation relative to the support frame 36 in which the handle links 84 are arranged at a second angle relative to the reference axis. For example, the handle links 84 may be parallel to the vertical axis V and/or perpendicular to the respective translation axis T and support frame 36. In some versions the first and second extended positions may be such that the handle links 84 articulate 90 degrees between the first and second extended positions, and in some cases, the handle links 84 may articulate less than or greater than 90 degrees between the first and second extended positions. The handle links 84 include extension axes E parallel with the translation axes T of the rails 72 in the first extended position and transverse to the translation axes T in the second extended position. In the embodiment shown in FIG. 4B, the extension axes E are perpendicular to the translation axes T in the upright orientation shown. It should be appreciated that other upright orientations are possible, such as other orientations in which the extension axes E are closer to perpendicular than parallel.

The grips 82 are located at a first height H1 relative to the support frame 36 in the first extended position (FIG. 3B) and the grip 82 are located at a second height H2 relative to the support frame 36, greater than the first height, in the second extended position (FIG. 4B). The heights H1, H2 can be measured from an uppermost surface of the support frame 36, from the translation axes T, from the patient support surface 42 (when all sections 41, 43, 45, 47 are horizontal), from the floor surface, or from any other suitable location to a closest surface of the grips 82, a center of mass of each of the grips 82, a geometric center of each of the grips 82, a topmost surface of the grips 82, or to any other suitable location related to the grips 82. The heights H1, H2 may be measured vertically, parallel to the vertical axis V, or could be measured in other ways, such as normal to the support frame 36, e.g., when the support frame 36 is not horizontally positioned. Regardless of the way in which the heights are measured, the grips 82 provide users with various advantages at each of the heights.

In the first extended position, for example, when in the retracted position and at the first height H1 (FIG. 3A), the grips 82 could be used to gain leverage and/or provide ergonomic lifting points when lifting the entire patient transport apparatus 30, for instance. In the second extended position, and at the second height H2 (FIG. 4B), the grips 82 are conveniently elevated above the patient support surface 42 of the foot section 47 so that users push/pull the patient transport apparatus 30 along the floor surface without bending over or slouching nearer the patient to reach the grips 82. The second height H2 may provide higher lifting points to ease lifting over bumps, curbs, or other obstacles, such as when the patient support surface 42 is at a lower height. Other advantages and uses of the grips 82 in each of the first extended position, first height H1, second extended position, and second height H2 are also contemplated.

Figure 5A:
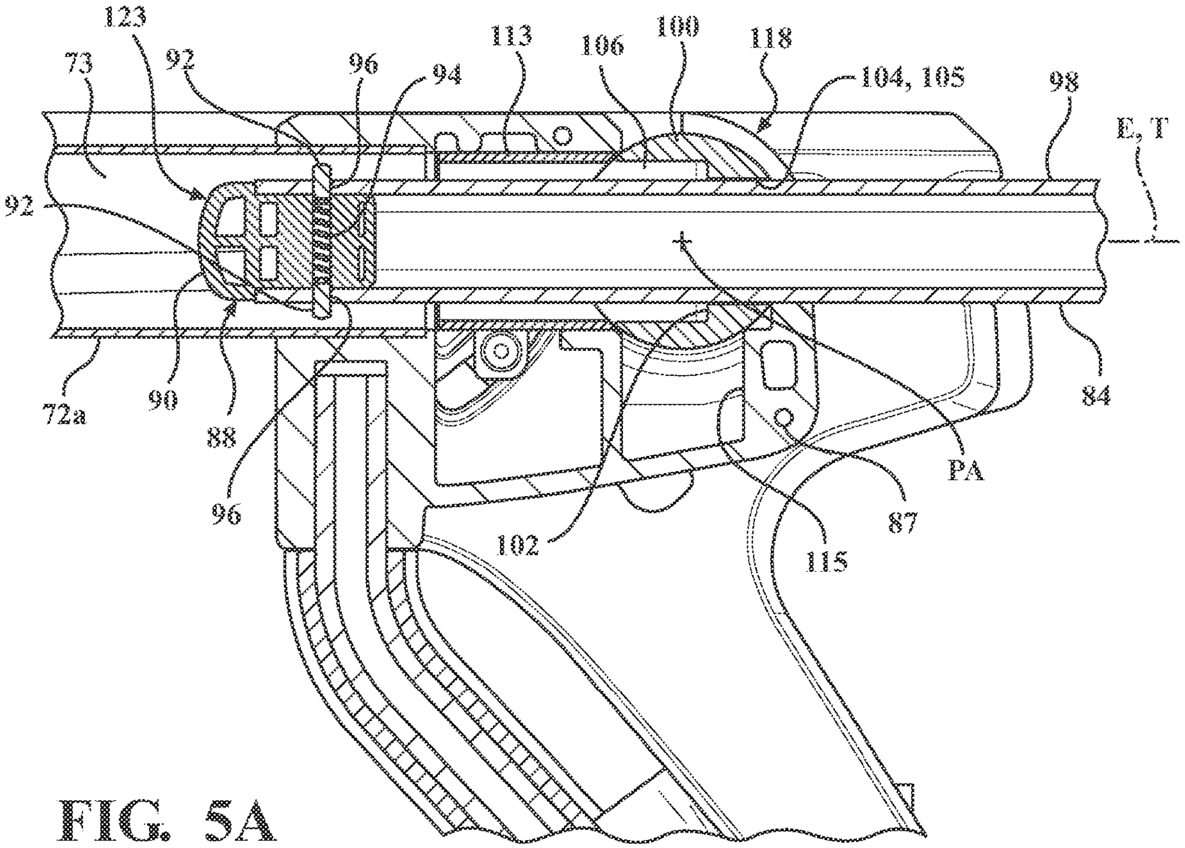
FIGS. 5A and 5B are partial cross-sectional views that illustrate movement of a handle link and a carrier as the handle assembly moves from the retracted position to the first extended position and are generally taken along the line 5-5 in FIG. 3B.
Figure 5B:
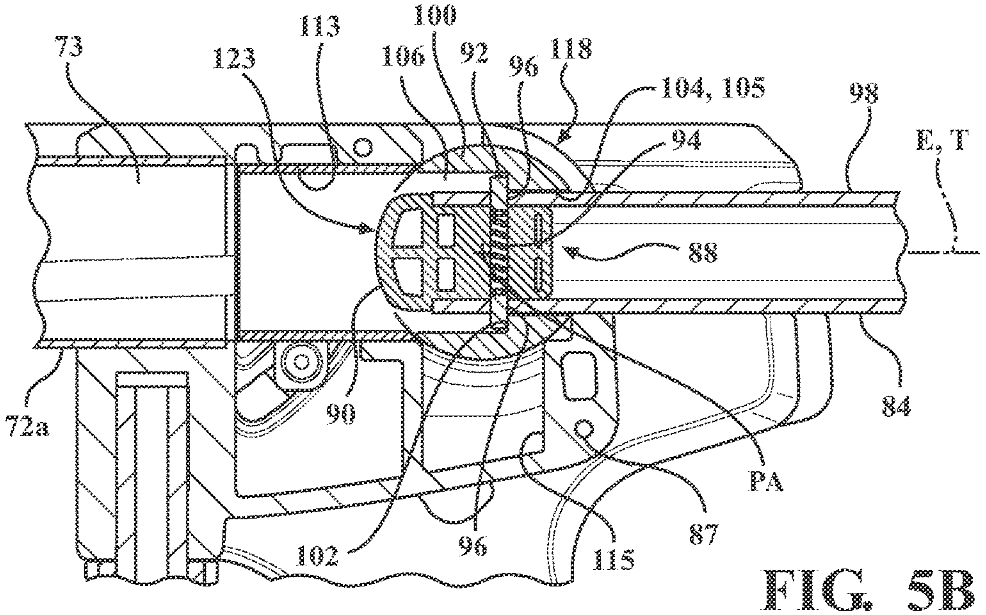

Referring to FIGS. 5A and 5B, the handle assembly 80 includes caps 88 connected to the handle links 84. The caps 88 are configured to slide along the translation axes T within the rails 72 from the retracted position to the extended position. In the version shown, there are two caps 88, one mounted to each of the handle links 84. Each cap 88 includes a cap body 90, a limit member 92, and one or more biasing devices 94 (e.g., one or more compression springs or other resilient elements) that urge the limit member outwardly toward an extended position. Here, the limit member is implemented as a pair of retention pins 92, which are disposed in the cap body 90 and movable to vary distance therebetween. The biasing device 94 acts to push the retention pins 92 through diametrically opposed openings 96 in a sidewall 98 of the handle link 84 such that the retention pins 92 protrude from an outer surface of the handle link 84. Other forms of caps 88 and limit members are also contemplated. In some versions, the caps 88 are integrally formed with the handle links 84 and/or may be formed in one-piece with the handle links 84. The caps 88 may be formed of plastic, metal, composites thereof, or any suitable material.

Figure 5C:
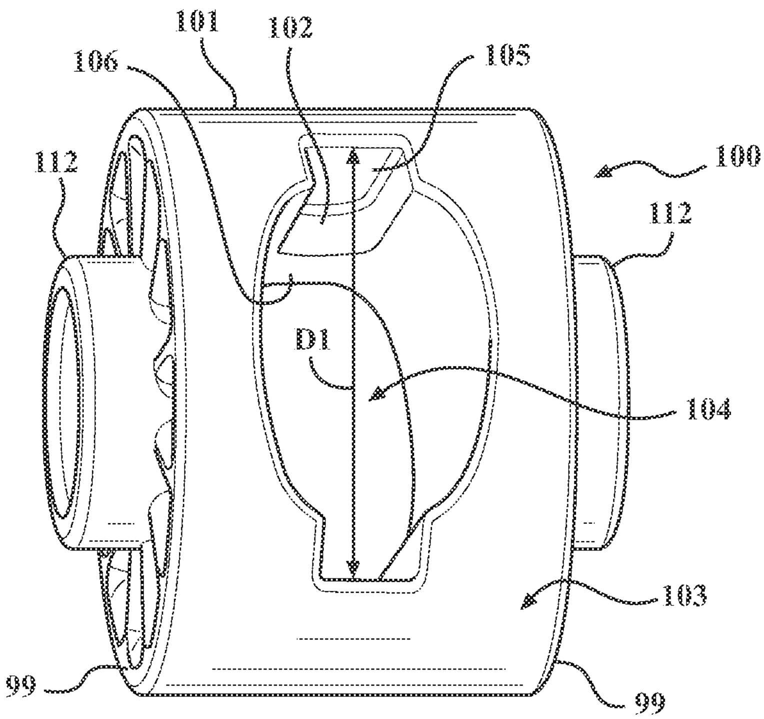
FIGS. 5C and 5D are perspective views of the carrier shown in FIGS. 5A and 5B.
Figure 5D:
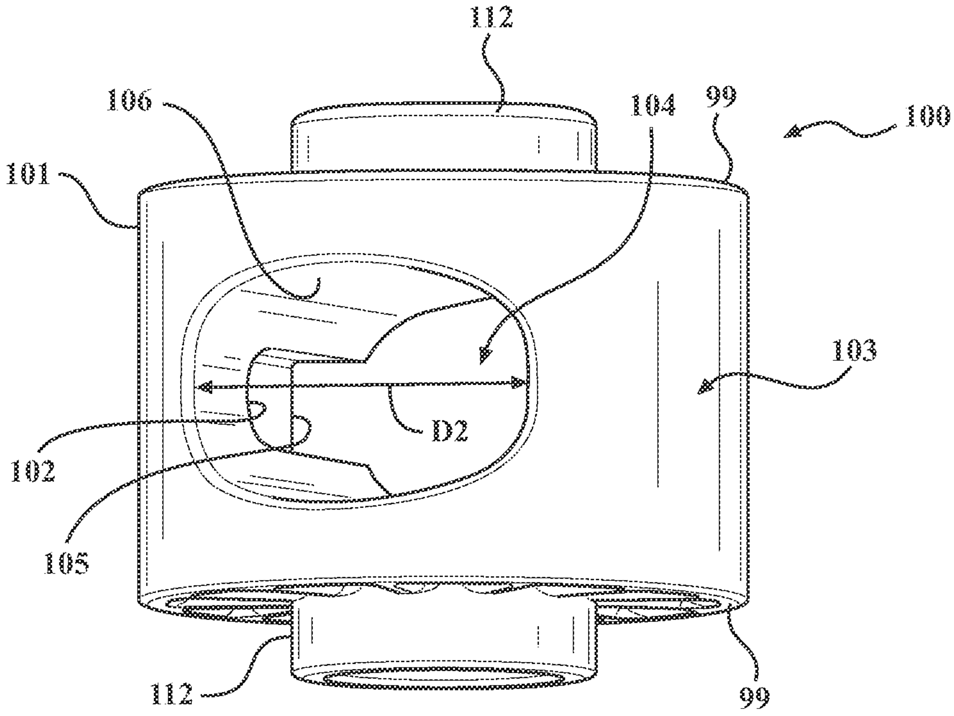

Best shown in FIGS. 5C and 5D, a carrier 100 is supported by the rail end housing 87 and is rotatable about a pivot axis PA of the handle assembly 80. The carrier 100 comprises a carrier body 101 having a curved outer surface 103 extending between two sides 99 to define a generally cylindrical shape aligned with the pivot axis PA. The carriers 100 are pivotally coupled to the rails 72 to enable articulation of the handle assembly 80 from the first extended position to the second extended position, and to all orientations therebetween. There is one carrier 100 for each of the handle links 84. The carriers 100 are pivotally coupled to the rail end housings 87.

Figure 7:
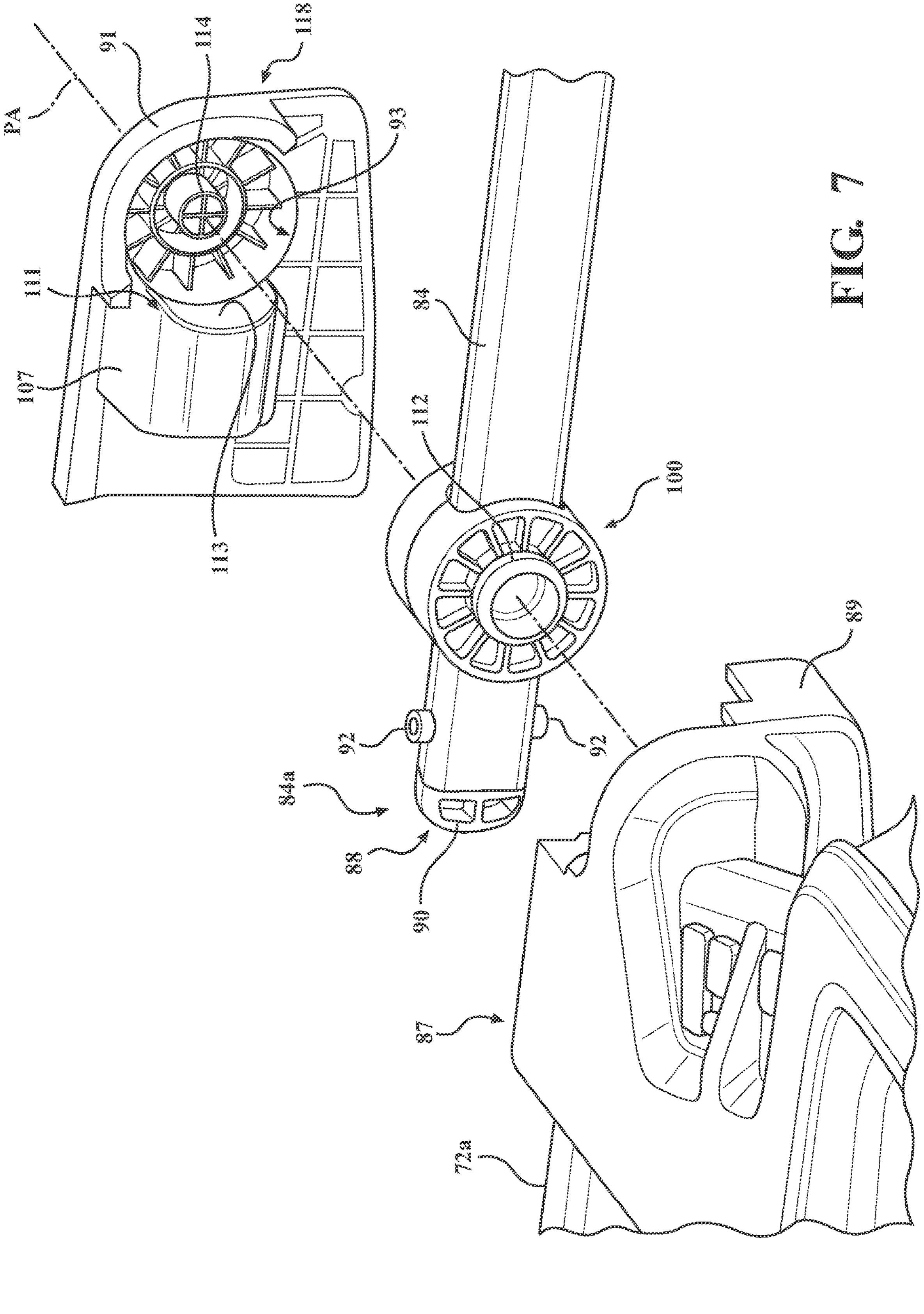
FIG. 7 is a partially exploded view of the handle assembly illustrating the handle shank and the carrier of the handle assembly.
Figure 8:
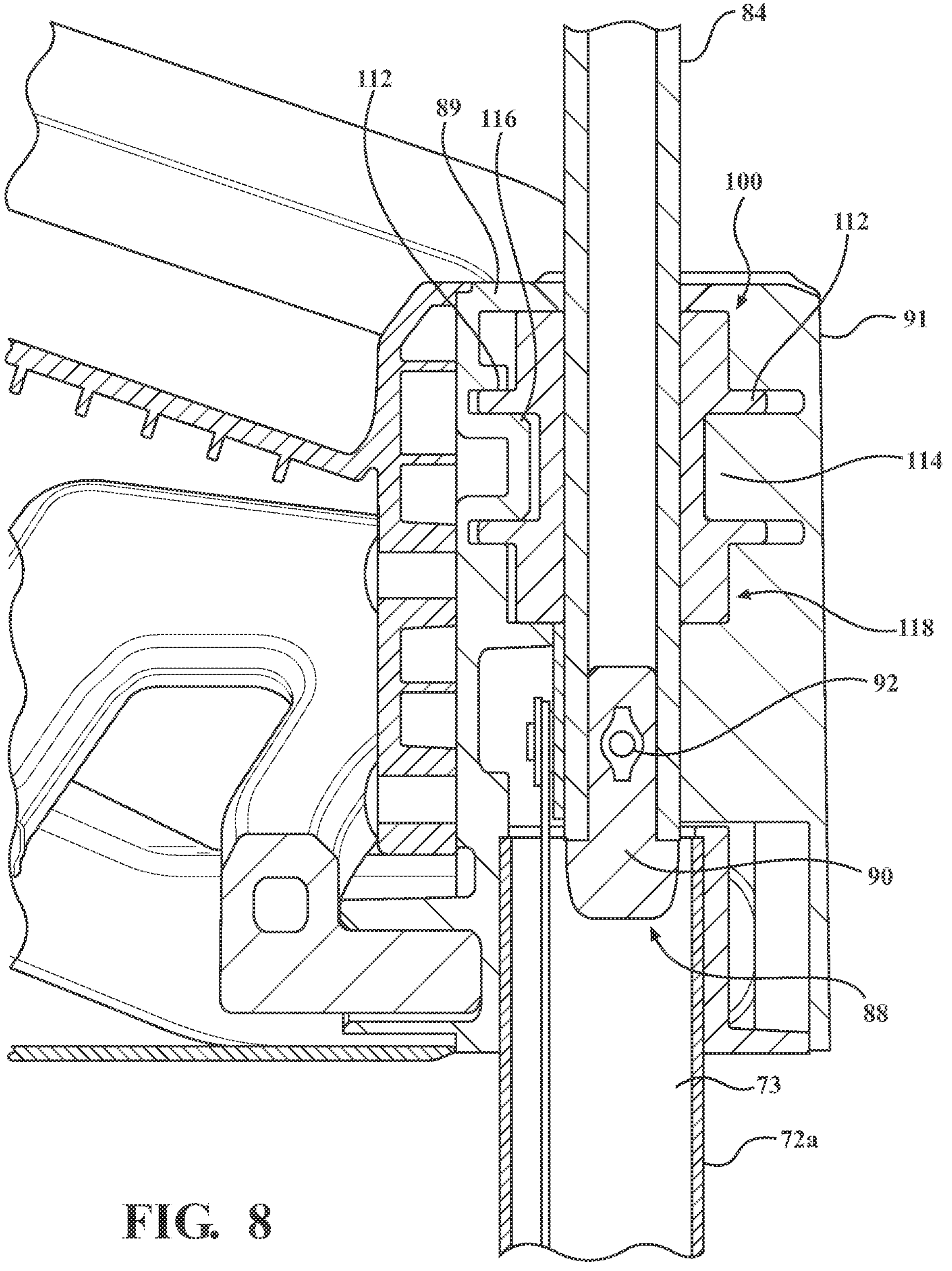
FIG. 8 is a partial cross-sectional view taken generally along the line 8-8 in FIG. 3B, but with the handle assembly in-between the retracted position and the first extended position.

FIGS. 7 and 8 provide additional views of one of the carriers 100 and its connection to one of the rail end housings 87. Each carrier 100 has a bushing portion 112 protruding from each side 99 of the carrier body 101 along the pivot axis PA. In some versions, the bushing portion 112 includes two bushing portions 112 that extend on either side of the carrier body 101 of the carrier 100. Each rail 72 includes a first spindle portion 114 and a second spindle portion 116. The bushing portion 112 pivots about the spindle portions 114, 116 (e.g., the bushing portion 112 and spindle portions 114, 116 may have complimentary cylindrical and/or coaxial shapes to allow relative rotation). As will be discussed in further detail below, a guide 118 may have one of the spindle portions 114, 116 integrally formed therewith. The guide 118 is attached to the rail end housing 87 to capture the carrier 100 therebetween, as best shown in FIG. 8. The carriers 100 may be formed of plastic, metal, composites thereof, or any suitable material.

Referring again to FIGS. 5C and 5D, the carrier 100 defines a carrier aperture 104, which may be an oblong-shaped passage that is sized to slidably receive the handle link 84 (which may also be oblong in shape) with little clearance between the outer surface of the handle link 84 and the carrier 100. The carrier aperture 104 may have a geometric cross-sectional shape to generally mate with a geometric cross-sectional shape of the handle link 84 (e.g., both are oblong) to prevent rotation of the handle link 84 about the translation axis T as it slides through the carrier aperture 104. In some versions, the carrier aperture 104 and/or handle links 84 may also be cylindrical in shape, or any other suitable shape for allowing telescoping of the handle link 84 within the carrier aperture 104 and along the translation axes T. The handle links 84 freely slide in their corresponding carrier apertures 104 from the retracted position to the extended position. Each carrier aperture 104 is sized so that the cap 88 is unable to pass through the carrier aperture 104 (i.e., thereby retaining the handle links 84). To this end, each carrier 100 includes a stop 102 that is sized to prevent the cap 88 from sliding past the carrier 100. The stop 102 is shown, for example, as a shoulder formed inside the carrier 100. The stop 102 limits the telescoping travel of the handle links 84 by abutting the retention pins 92 and preventing further translation of the handle links 84 (see FIG. 5B).

As best shown in FIGS. 5C and 5D, each carrier aperture 104 has a first portion 105 and a second portion 106 in communication with each other. Each of the first portion 105 and the second portion 106 define a height that correspond to the cap 88 and the retaining pins 92. More specifically, the first portion 105 defines a first height D1 and the second portion 106 defines a second height D2. The first height D1 corresponds to an outer distance D3 (FIG. 10) between the retention pins 92 in an extended position and is greater than the second height D2. Said differently, the outer distance D3 between the retention pins 92 is greater than the second height D2 of the second portion 106 of the carrier aperture 104. The second height D2 corresponds to an outer dimension of the cap 88. More specifically, the second portion 106 may be sized and shaped to slidable receive the retention pins 92 of the cap 88 (see FIG. 5B). As will be discussed in further detail below, the carrier 100 is assembled onto the handle links 84 and configured with the first portion 105 arranged nearer to the support structure 32 when the handle links 84 are in the retracted position.

As the handle links 84 move between the retracted position and the first extended position the caps 88 remain at least partially outside of the carriers 100, as shown in FIG. 5A, and the carriers 100 are unable to freely pivot about their pivot axis PA, i.e., portions of the handle assembly 80 remain within the extension rails 72*a* such that lifting of the grips 82 would cause the distal end portions 84*a* of the handle links 84 to bear against an inner surface of the extension rails 72*a* and lift the patient transport apparatus 30.

Figure 6A:
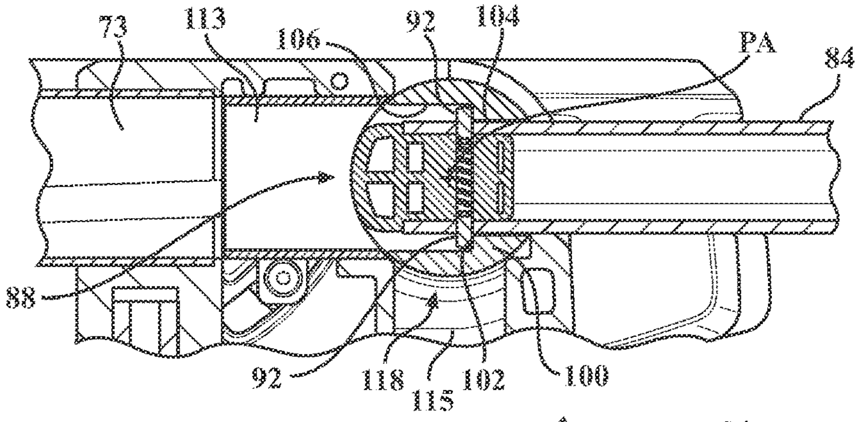
FIGS. 6A-6D are partial cross-sectional views that illustrate movement of the handle shank and carrier between the first extended position and the second extended position and are generally taken along the line 6-6 in FIG. 4B.
Figure 6B:
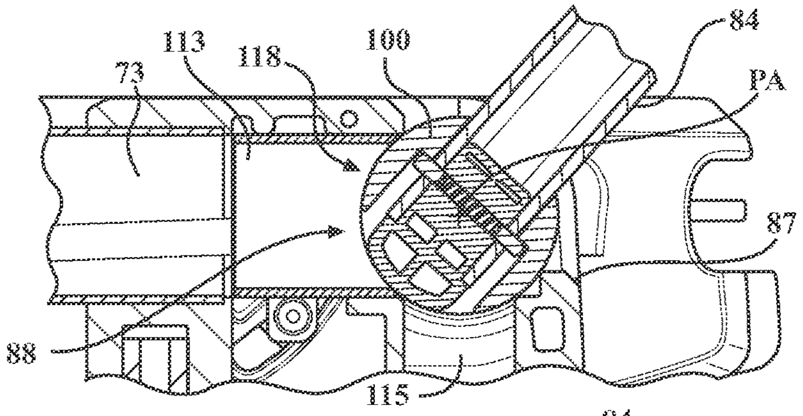
Figure 6C:
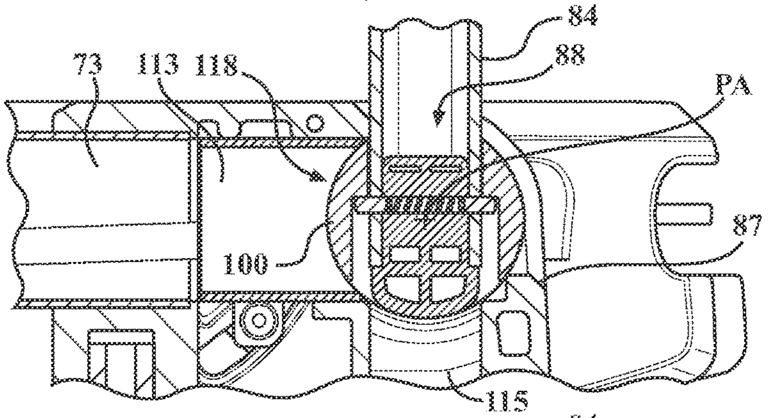
Figure 6D:
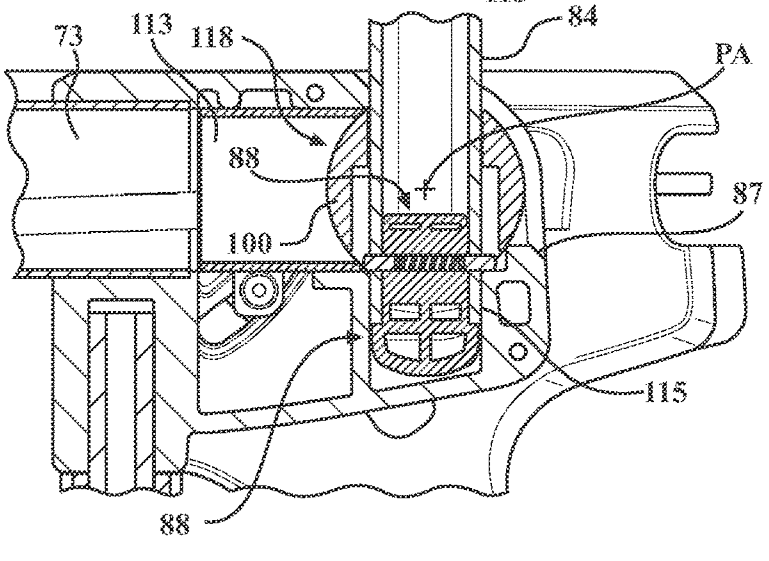

Referring to FIGS. 6A-6D, once the cap 88 is fully received in both portions 105, 106 of the carrier aperture 104 (see FIG. 6A), e.g., the retention pins 92 are fully seated against the stop 102, then the handle assembly 80 is ready to be articulated from the first extended position to the second extended position. More specifically, the distal end portion 84*a* of the handle links 84 have cleared the extension rails 72*a* to prevent further interference with the extension rails 72*a* when lifting the grips 82. FIGS. 6B-6D illustrate articulation of the handle assembly 80 to different orientations including to the second extended position (FIG. 6C) and a braced position (FIG. 6D). Once the handle assembly 80 has been placed in the second extended position, such as an upright orientation, then the carrier aperture 104 aligns with sockets 113, 115 formed in the rail end housings 87.

Best shown in FIGS. 5A, 5B, and 7, each of the rail end housings 87, which are operatively attached to the support structure 32, comprises a guide 118 for supporting the carrier 100 for rotation about the pivot axis PA. The rail end housings 87 may further comprise an inner housing 89 and an outer housing 91, which cooperate to define the guide 118. The guide 118 may comprise a circular support surface 93 that is arranged about the pivot axis PA and configured to engage the curved outer surface 103 of the carrier 100 when the carrier 100 is received in the guide 118.

As the handle links 84 move between the various orientations, unintended movement of the handle assembly 80 is prevented by a pair of shank braces. To this end, the handle assembly 80 may further comprise a first shank brace 107 and a second shank brace 108 adjacent to the guide 118. The first shank brace 107 may be formed on the outer housing 91 aligned with the rail bore 73 and the second shank brace 108 may be formed on the inner housing 89. Both the first shank brace 107 and the second shank brace 108 may further comprise an inlet face 111 arranged adjacent to the guide 118 and the carrier 100 to receive the handle links 84. The inlet face 111 has a curved profile that is complementary to the curved outer surface 103 of the carrier 100 to permit rotation of the carrier 100.

In order to facilitate movement of the handle assembly 80 between the retracted position, the first extended position, and the second extended position, each of the first shank brace 107 and the second shank brace 108 may define a corresponding socket. The first shank brace 107 may define a first socket 113 aligned with the translation axis T and the second shank brace 108 may define a second socket 115 at an angle to the translation axis T. In order to receive the handle link 84 when the handle assembly 80 is in the retracted position the first socket 113 has a socket dimension that is approximately equal to the first height D1 if the first portion 105 of the carrier aperture 104.

As mentioned above, the handle assembly 80 may be movable between the second extended position (FIG. 6C) and a braced position (FIG. 6D). In the braced position gravity and/or user force may then cause the handle assembly 80 to seat into the second socket 115. More specifically, the distal end portions 84*a* of the handle links 84, which may include portions of the cap bodies 90, are sized to seat into the second socket 115 to hold and secure the handle assembly 80 in the upright orientation so that the user may push/pull on the handle assembly 80 to maneuver the patient transport apparatus 30. When seated in the second socket 115, the handle links 84 interfere with rotation of the carriers 100 thereby temporarily locking the handle assembly 80 in the upright orientation. The distal end portions 84*a* may have a size and/or shape (e.g., oblong, generally cylindrical, etc.) that generally matches a size and/or shape of the second socket 115 so that the distal end portions 84*a*, when seated in the second socket 115, are substantially retained in the second socket 115 and prohibited from articulating due to interference with one or more walls of the rail end housings 87 that define the second socket 115 (see FIG. 6D). The distal end portion 84*a* may have a suitable length (e.g., 0.1 inches, 0.5 inches, 1.0 inches or more) to facilitate such interference. Movement of the handle assembly 80 between the first extended position and the second extended position is permitted when the distal end portion 84*a* of the handle link 84 and the cap 88 are disposed in the carrier 100. Said differently, the handle link 84 is disposed in neither the first socket 113 or the second socket 115 in the first extended position.

Figure 9:
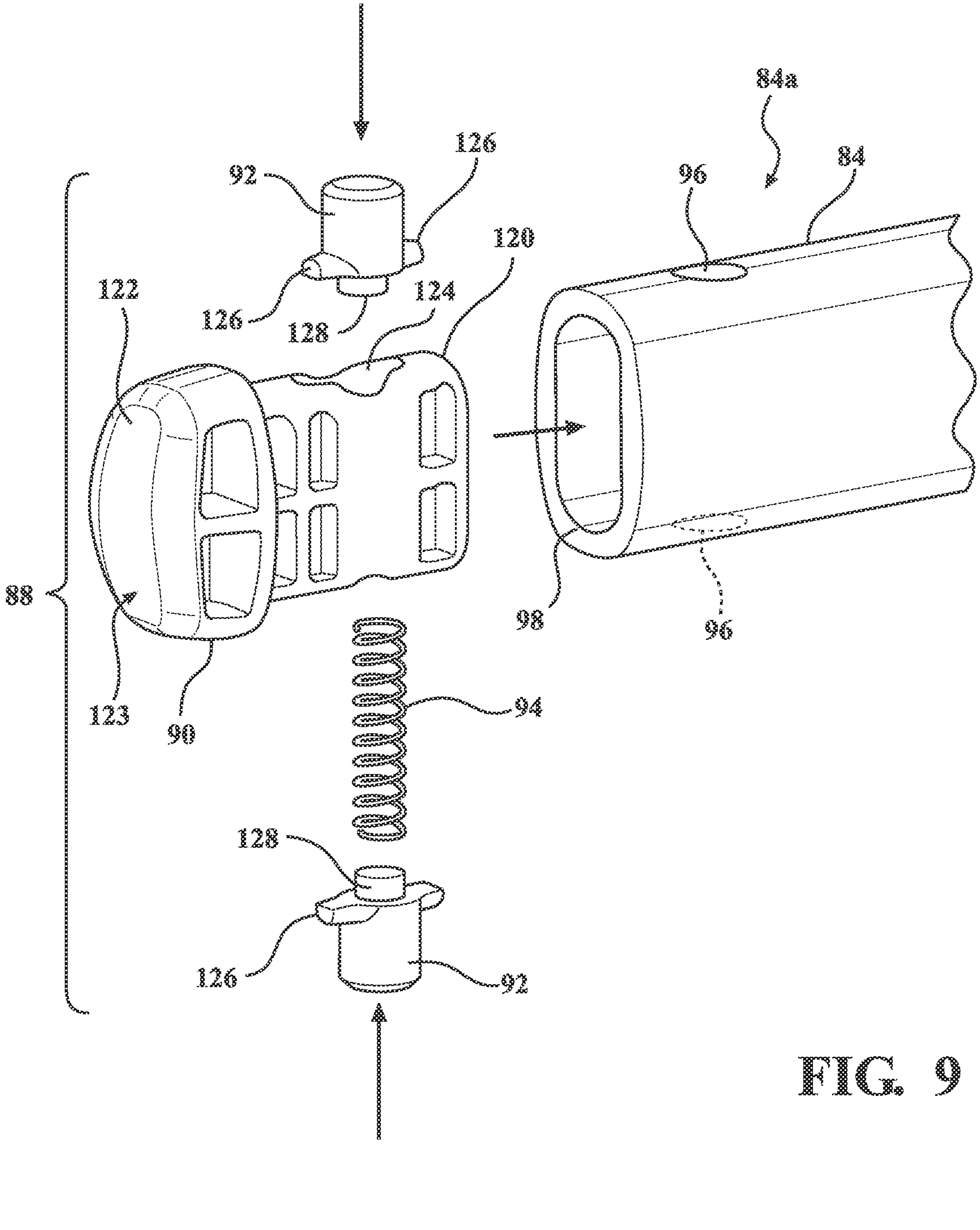
FIG. 9 is an exploded view of a distal end of the shank for the handle assembly including a cap and a limit member.
Figure 10:
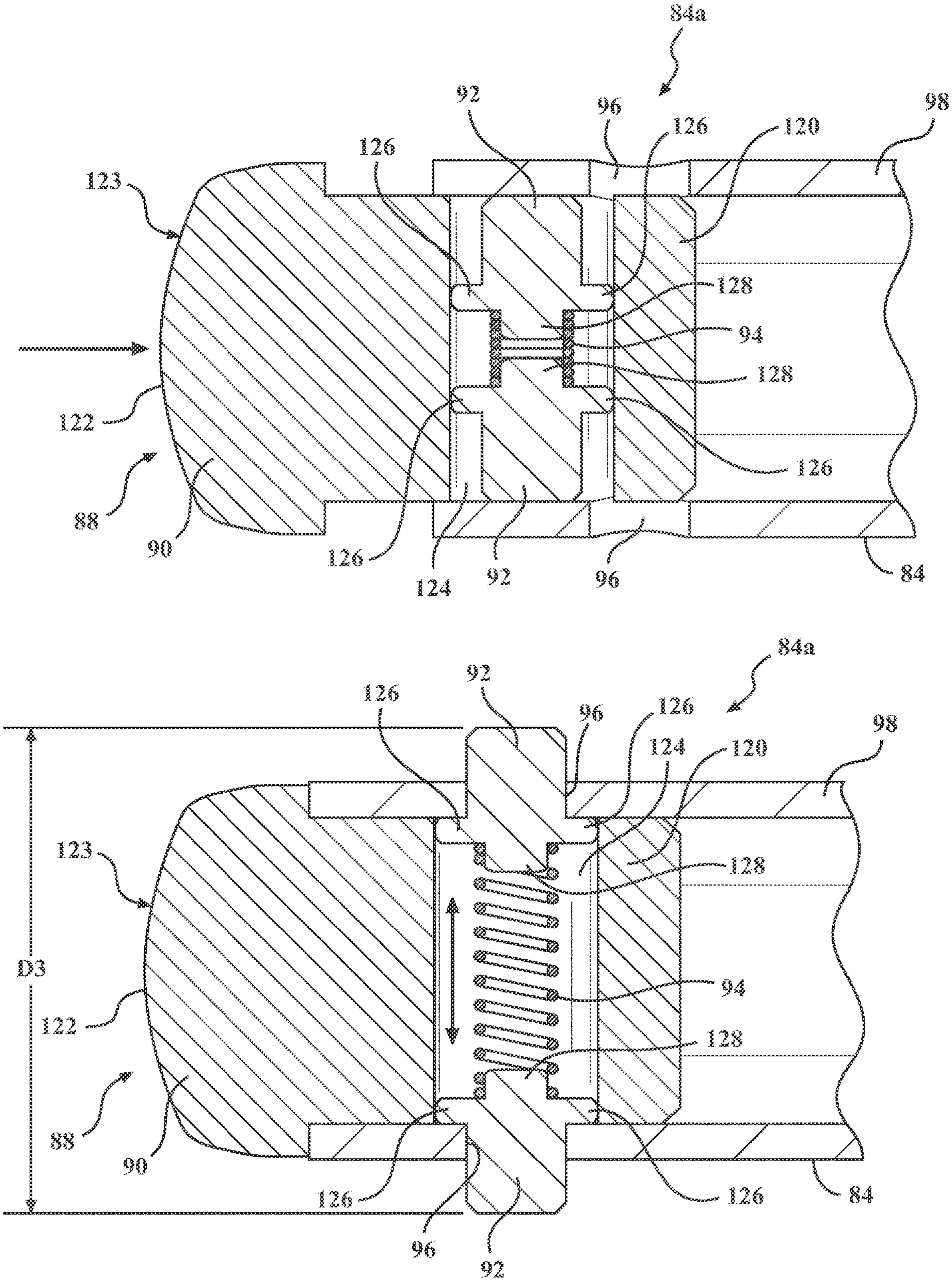
FIG. 10 illustrates assembly steps of the cap and the shank of FIG. 9.

Referring to FIGS. 9 and 10, one of the caps 88 is shown in greater detail. As illustrated, the cap body 90 has a neck 120 sized to slide into the handle link 84 and a head 122 sized larger than an inner passage of the handle link 84 to form an end surface 123 of the handle link 84. The cap body 90 may also define a through passage 124 sized to slidably receive the retention pins 92. The end surface 123 of the cap body 90 is curved so as to match the curved outer surface 103 of the carrier 100. The curve of the end surface 123 allows the head 122 to sit flush, or nearly flush, with the cap body 90 when the handle is in the first and second extended positions and so that the cap 88 may be fully received in the guide 118.

The retention pins 92 may have protrusions 126, or other suitable geometric feature or features, to prevent the retention pins 92 from passing through the openings 96 in the sidewall 98 of the handle link 84. The retention pins 92 may also have seats 128 to hold the biasing device 94. Assembly of the cap 88 onto the handle link 84 in shown in FIG. 10. Once the retention pins 92 are compressed and then inserted into the handle links 84, the retention pins 92 align with the openings 96 in the handle links 84 and biasing force (e.g., spring force) from the biasing device 94 forces the retention pins 92 into their final assembled position, protruding from the outer surface of the handle links 84.

Figure 11A:
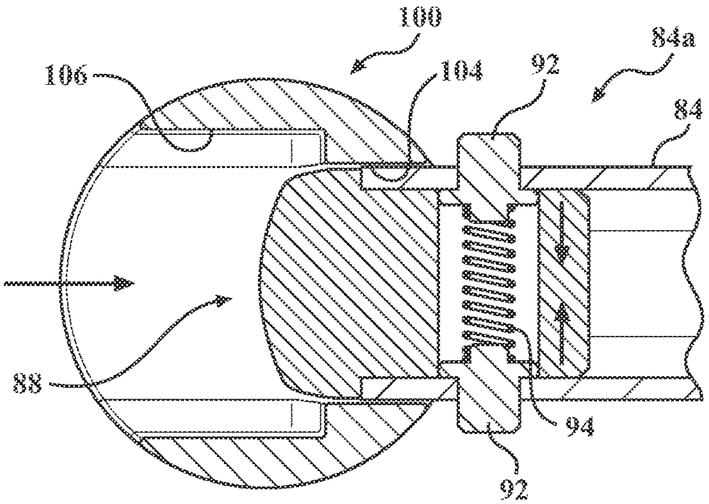
FIGS. 11A and 11B illustrate proper assembly of the carrier on the handle link and past the limit member.
Figure 11B:
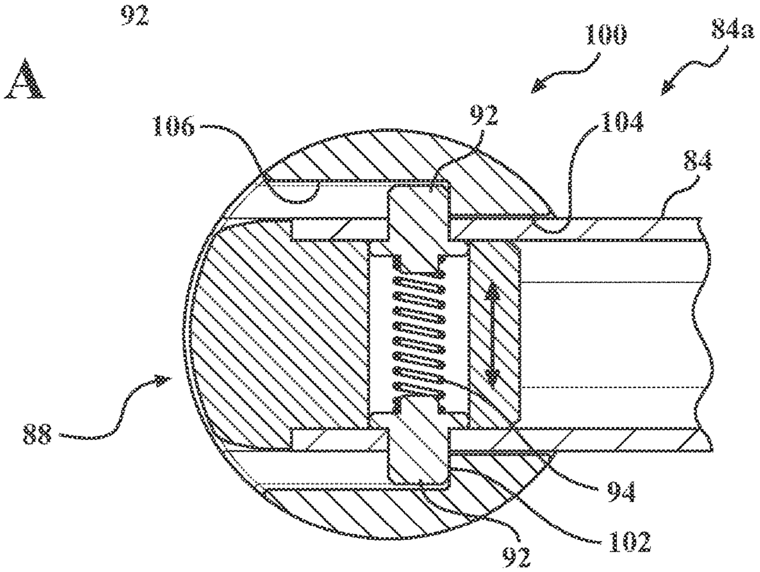
Figure 11C:
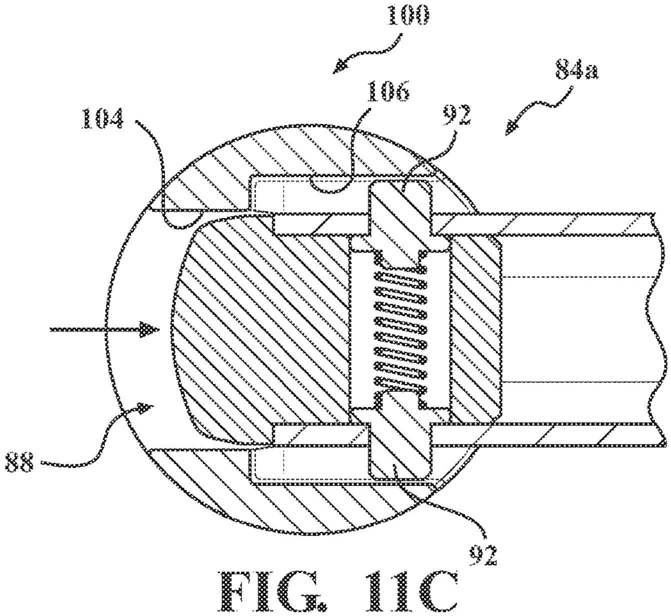
FIG. 11C illustrates an attempt to improperly assemble the carrier onto the handle link.

FIGS. 11A and 11B illustrate proper assembly of the carrier 100 onto the handle link 84 and past the cap 88. As shown, during assembly, the carrier 100 is slid onto the handle link 84 over the cap 88 until reaching the retention pins 92. At that point, an operator pinches the retention pins 92 inwardly toward one another so that they are able to slide through the first portion 105 of the carrier aperture 104. The operator then further slips the carrier 100 onto the handle link 84 past the retention pins 92 until the retention pins 92 reach the second portion 106 where they spring outwardly and prevent the handle link 84 from sliding back through the carrier 100. FIG. 11C illustrates an attempt to improperly assemble the carrier 100 onto the handle link 84. However, the cap 88 is designed to prevent such assembly. More specifically, the cap 88 is configured such that the cap 88 cannot be assembled improperly owing to the retention pins 92 being inaccessible to the operator in the second portion 106 such that the operator would be unable to pinch the retention pins 92 inwardly as needed to pass through the first portion 105.

Figure 12:
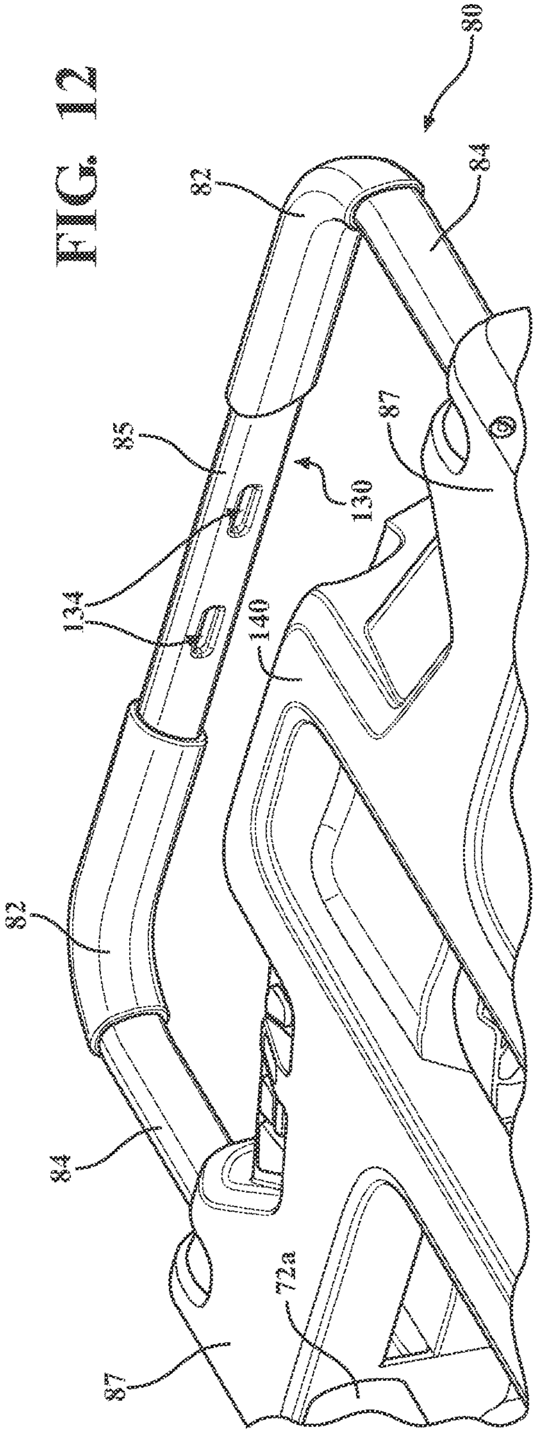
FIG. 12 is a perspective view of the handle assembly illustrating a handle released from a latch assembly.
Figure 13:
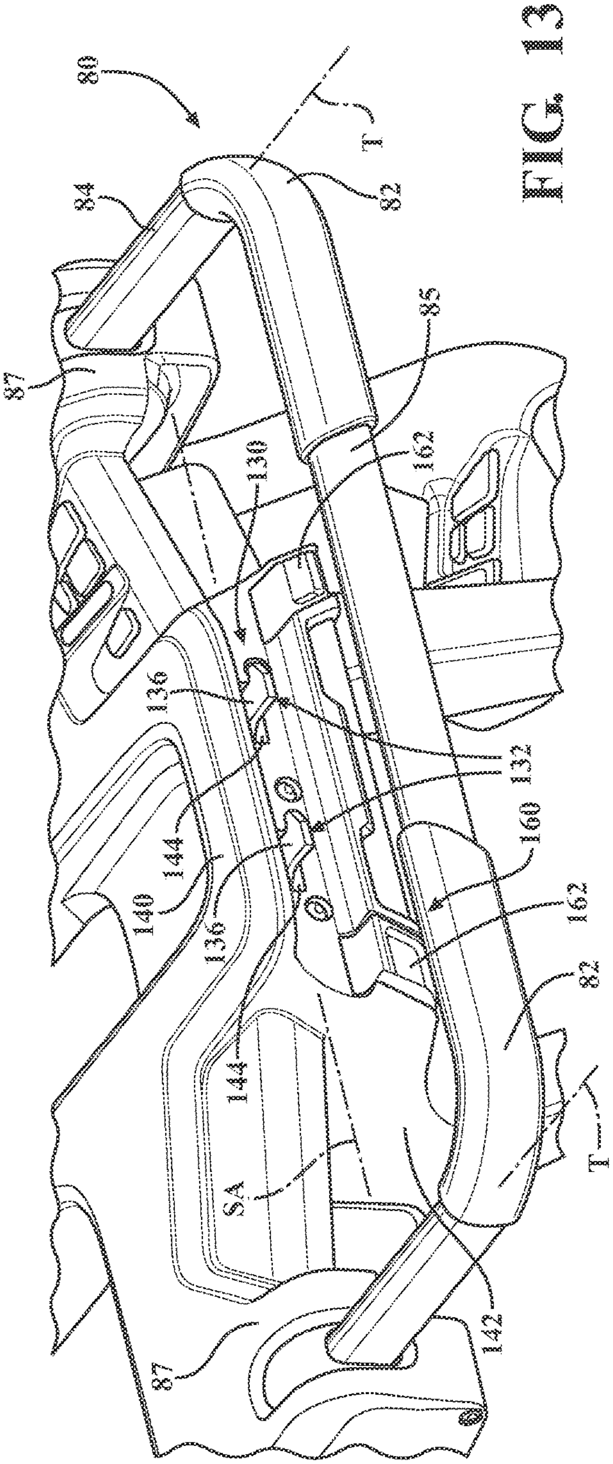
FIG. 13 is a perspective view of the handle assembly illustrating parts of the latch assembly.
Figure 14:
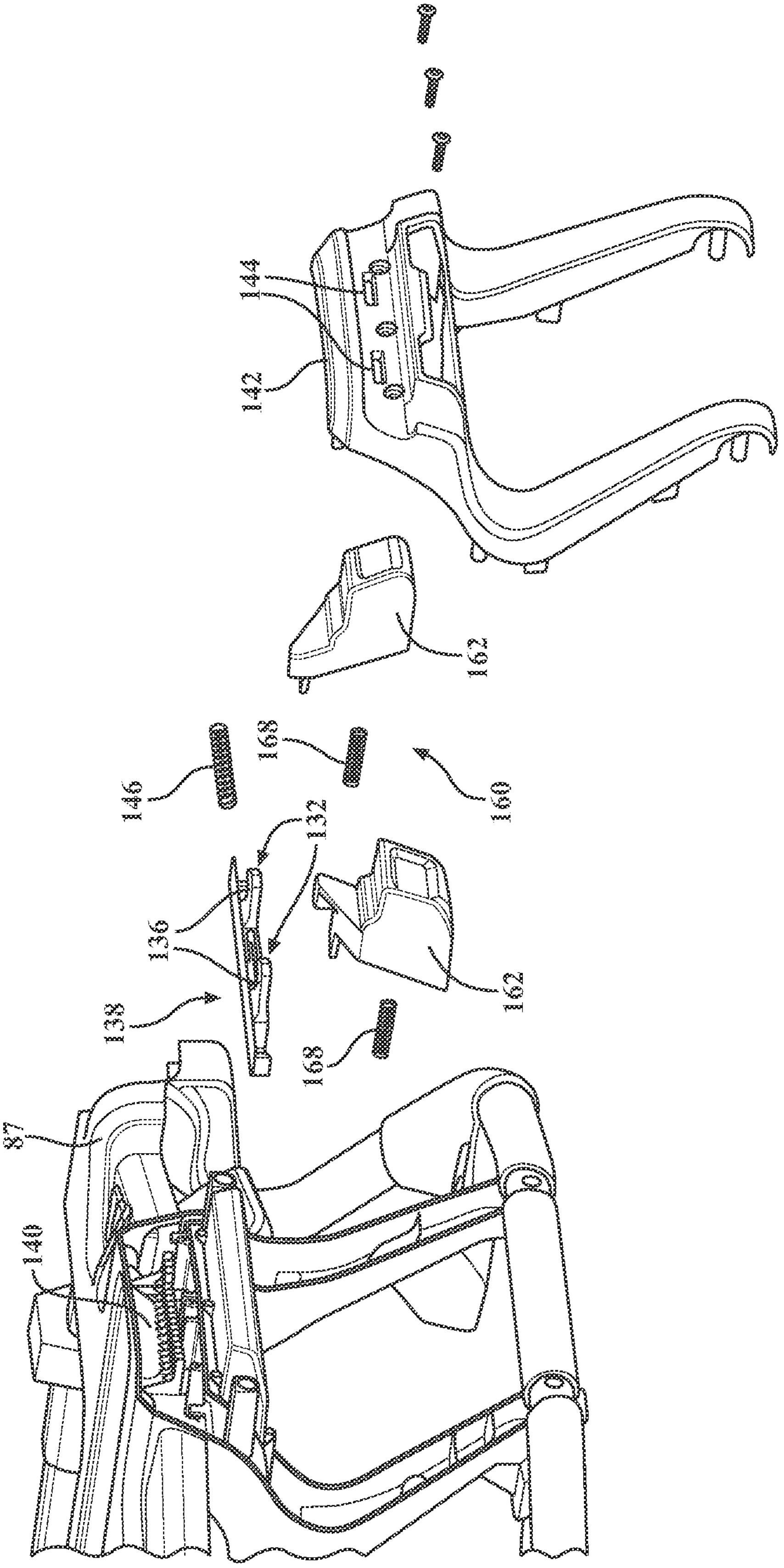
FIG. 14 is a partially exploded view of the latch assembly and a release device.

Referring to FIGS. 12-14, the handle assembly 80 may further include a latch assembly configured to lock the handle assembly 80 relative to the rails 72 and the support frame 36 in the retracted position. The latch assembly is selectively releasable to permit movement of the grips 82. The latch assembly includes a lock 130 having one or more first locking elements 132 (see FIG. 13) coupled to the rail end housing 87. The lock 130 also has one or more second locking elements 134 (see FIG. 12) associated with the handle assembly 80. It should be noted that, while pairs of such locking elements 132, 134 are shown, only one first and one second locking element may be employed, or additional locking elements may be employed.

In the version shown, the first locking elements 132 include latches and the second locking elements 134 include catches adapted to receive the latches and hold the handle assembly 80 in a locked state. The latches shown include hooks 136 that are laterally movable. The hooks 136 form part of a latch slider 138 (see FIG. 14) that slides along a slide axis SA (see FIG. 13) oriented generally perpendicular to the translation axes T.

Figure 15A:
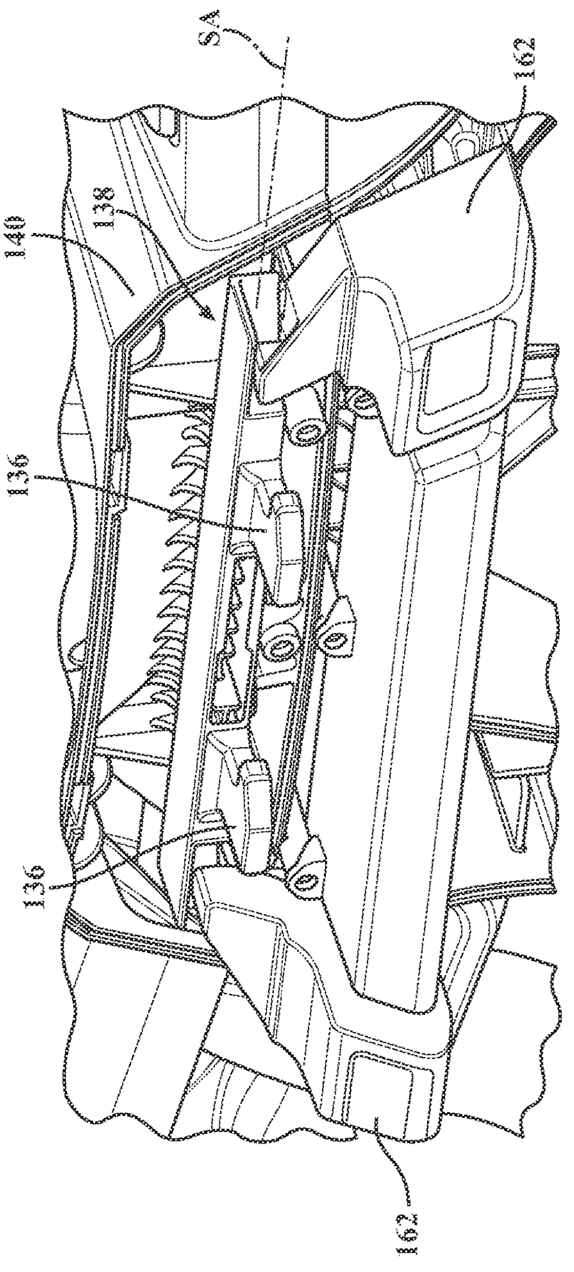
FIG. 15A is a perspective view of locking elements of the latch assembly.
Figure 15B:
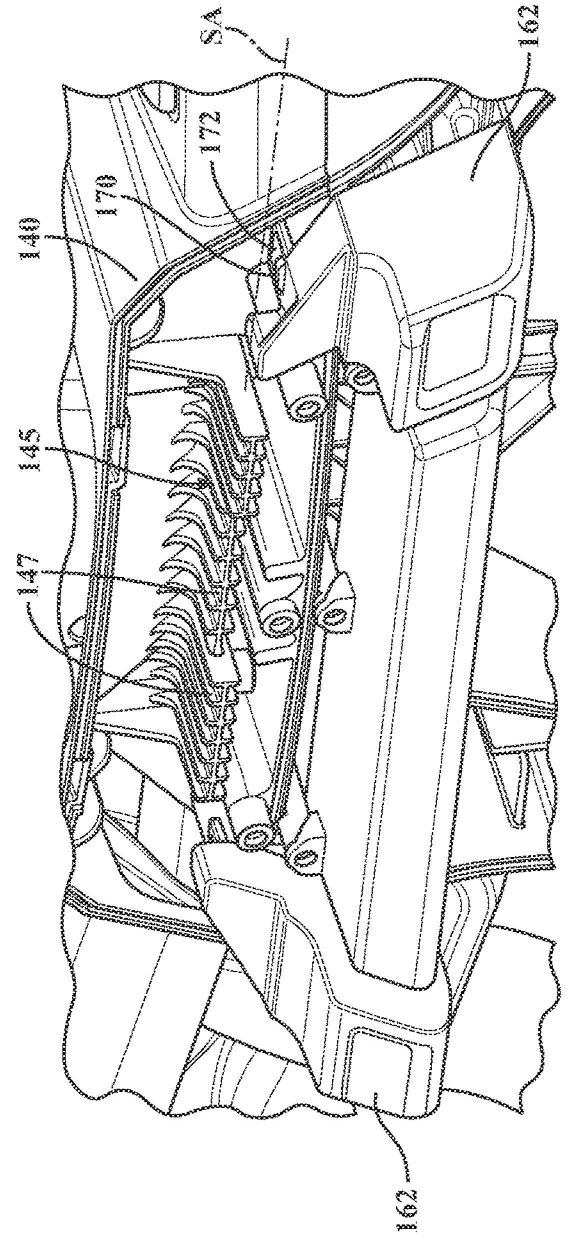
FIG. 15B is a perspective view with the locking elements of FIG. 15A removed.

A lock housing 140 retains and supports the latch slider 138 and associated hooks 136 (see lock housing 140 with latch slider 138 removed in FIG. 15B). In some versions, the lock housing 140 may include a rib structure 145 having a plurality of structural ribs 147 that are arranged to slidably support the latch slider 138, as best shown in FIGS. 15A and 15B. The lock housing 140 may also include a solid slide rail along which the latch slider 138 slides, or other suitable structures may be used.

The lock housing 140 may be integrally formed with the rail end housings 87 or may be a separate housing. The lock housing 140 and the rail end housings 87 collectively form a foot end housing that slides via the telescoping inner and outer rails 72*a*, 72*b*, as previously described. The lock housing 140 includes a cover 142 (see FIG. 14) having openings 144 through which the hooks 136 protrude. The cover 142 captures the latch slider 138 within the lock housing 140 such that the latch slider 138 is retained from moving longitudinally relative to the support frame 36, but is able to slide laterally relative to the support frame 36 along the slide axis SA.

Figure 16A:
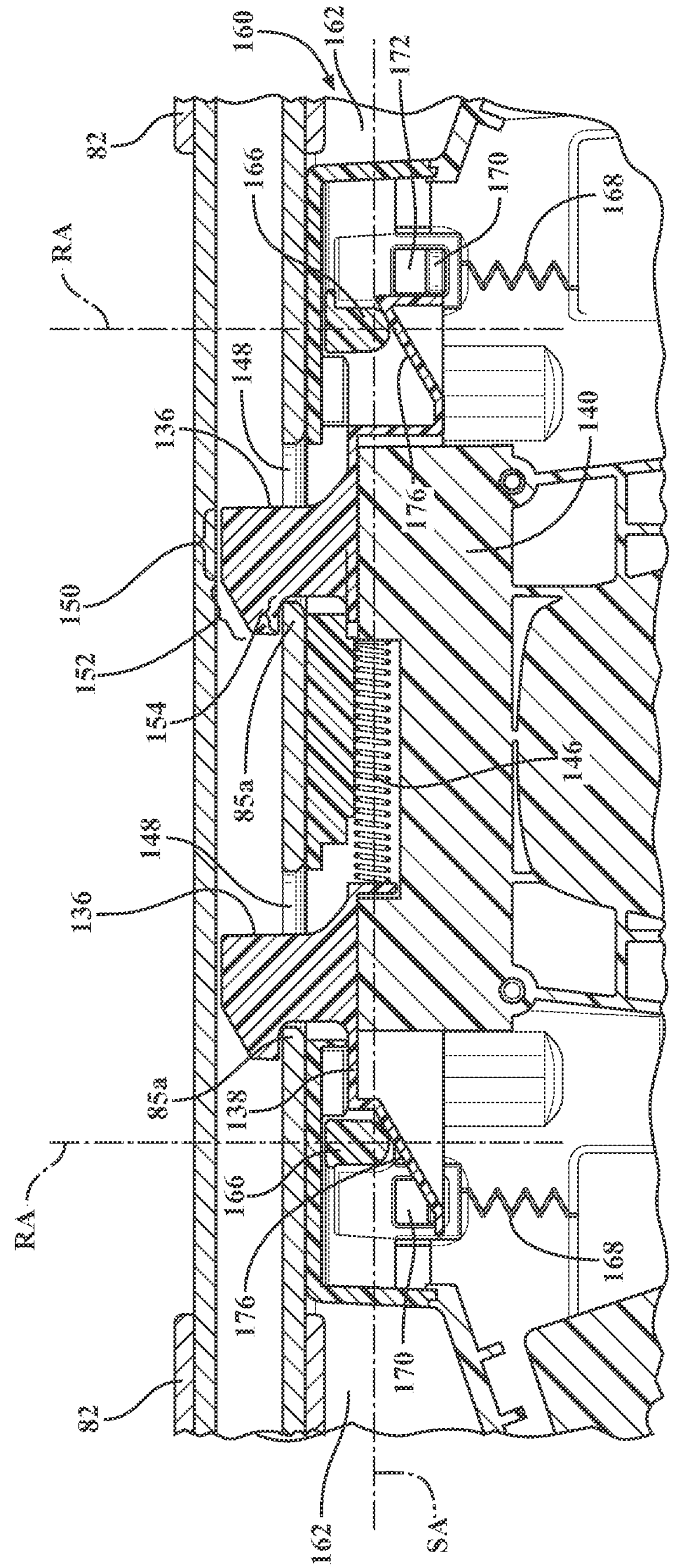
FIG. 16A is a partial cross-sectional view taken generally along the line 16-16 in FIG. 3A and illustrates the latch assembly and the release device.
Figure 16B:
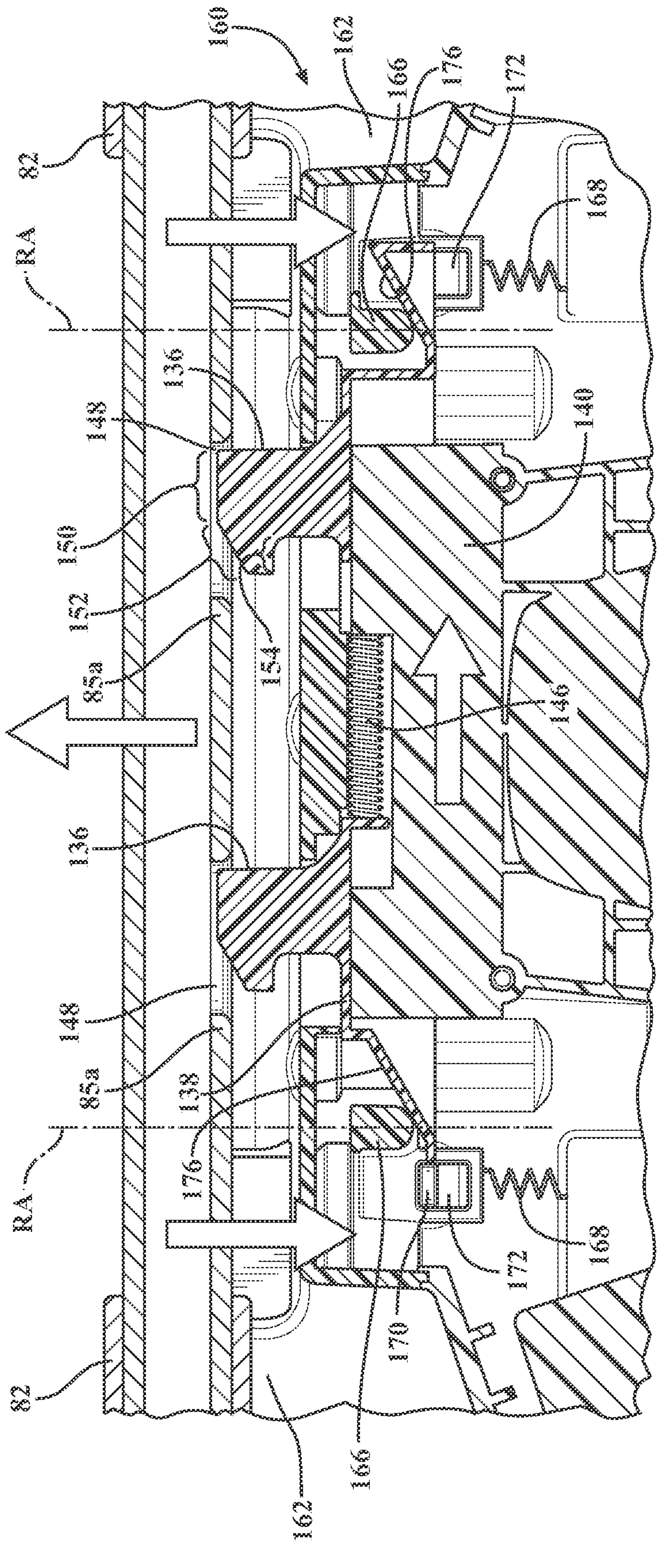
FIG. 16B is a partial cross-sectional view similar to FIG. 16A, but illustrating operation of the release device to release the latch assembly.
Figure 17B:
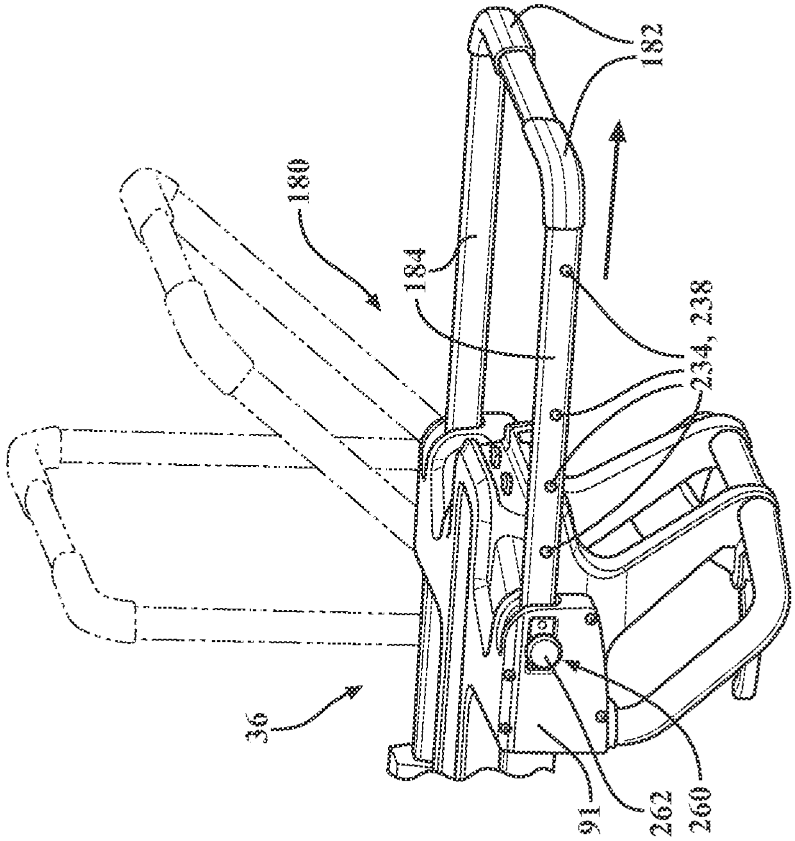
FIGS. 17A and 17B illustrate movement of the alternative handle assembly of FIGS. 16A and 16B between a retracted position and a first extended position.
Figure 17A:
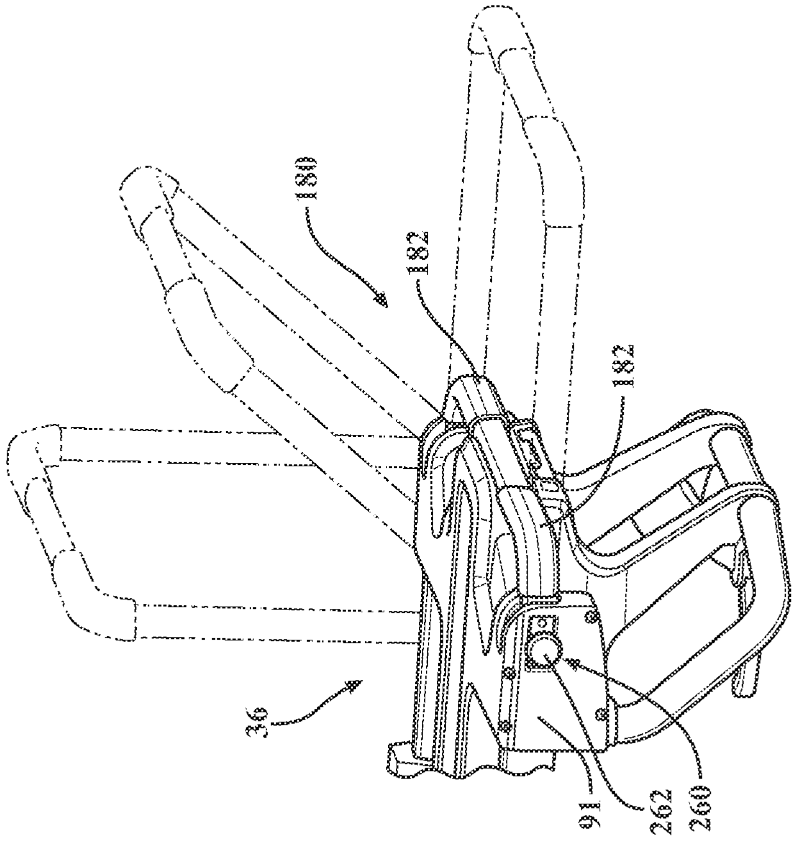
Figure 18B:
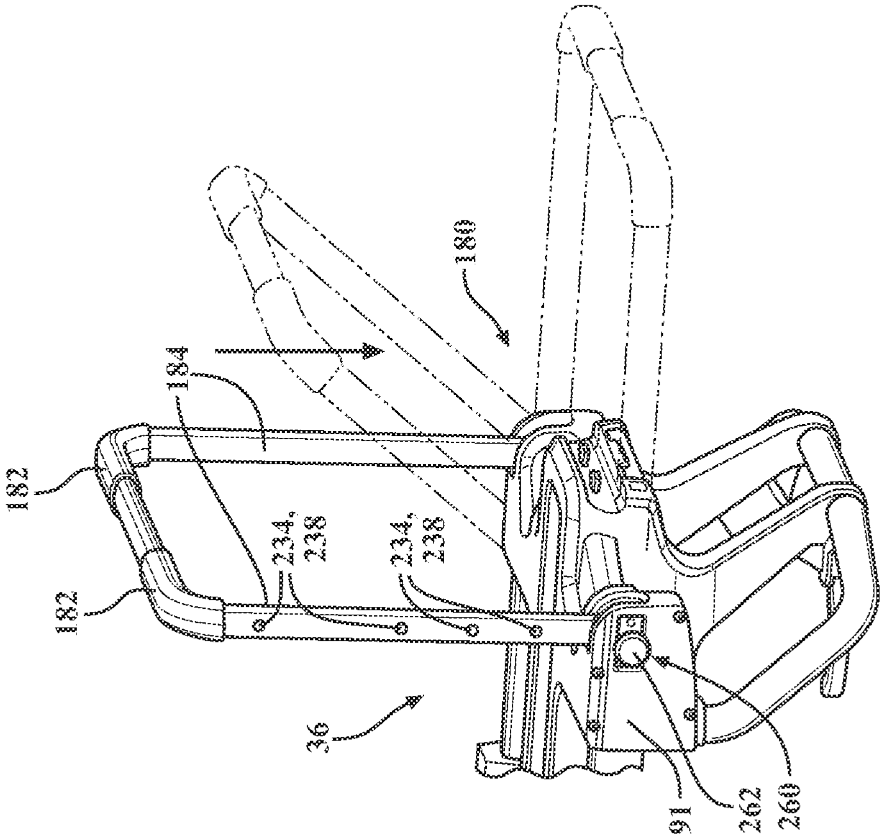
FIGS. 18A and 18B illustrate movement of the alternative handle assembly between the first extended position and a second extended position.
Figure 18A:
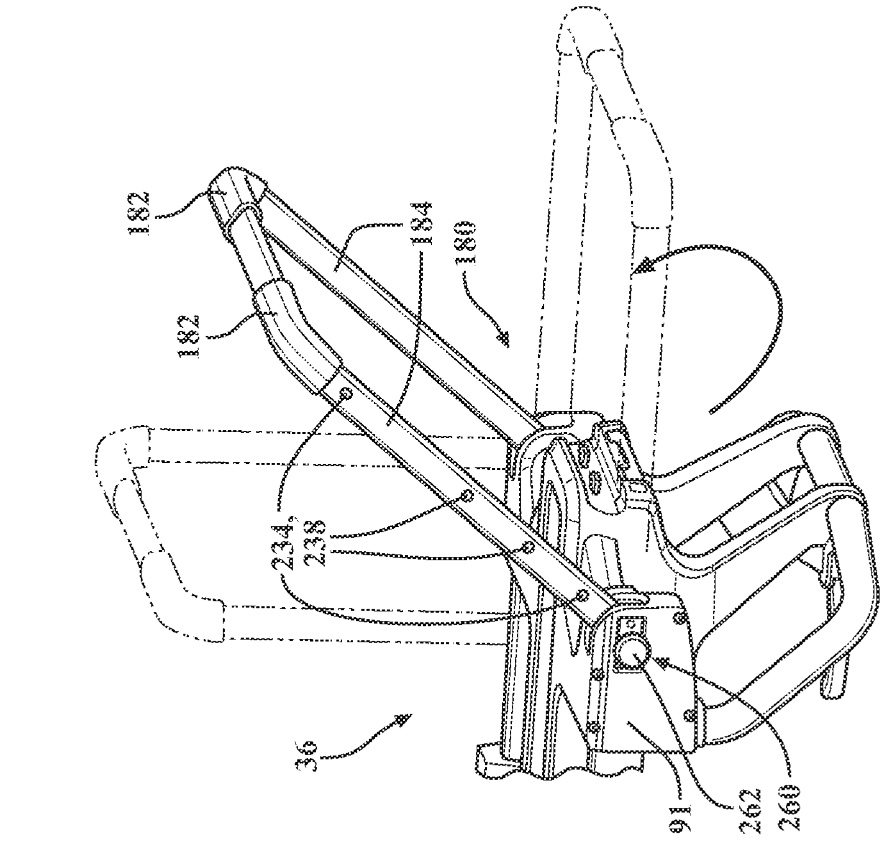
Figure 19:
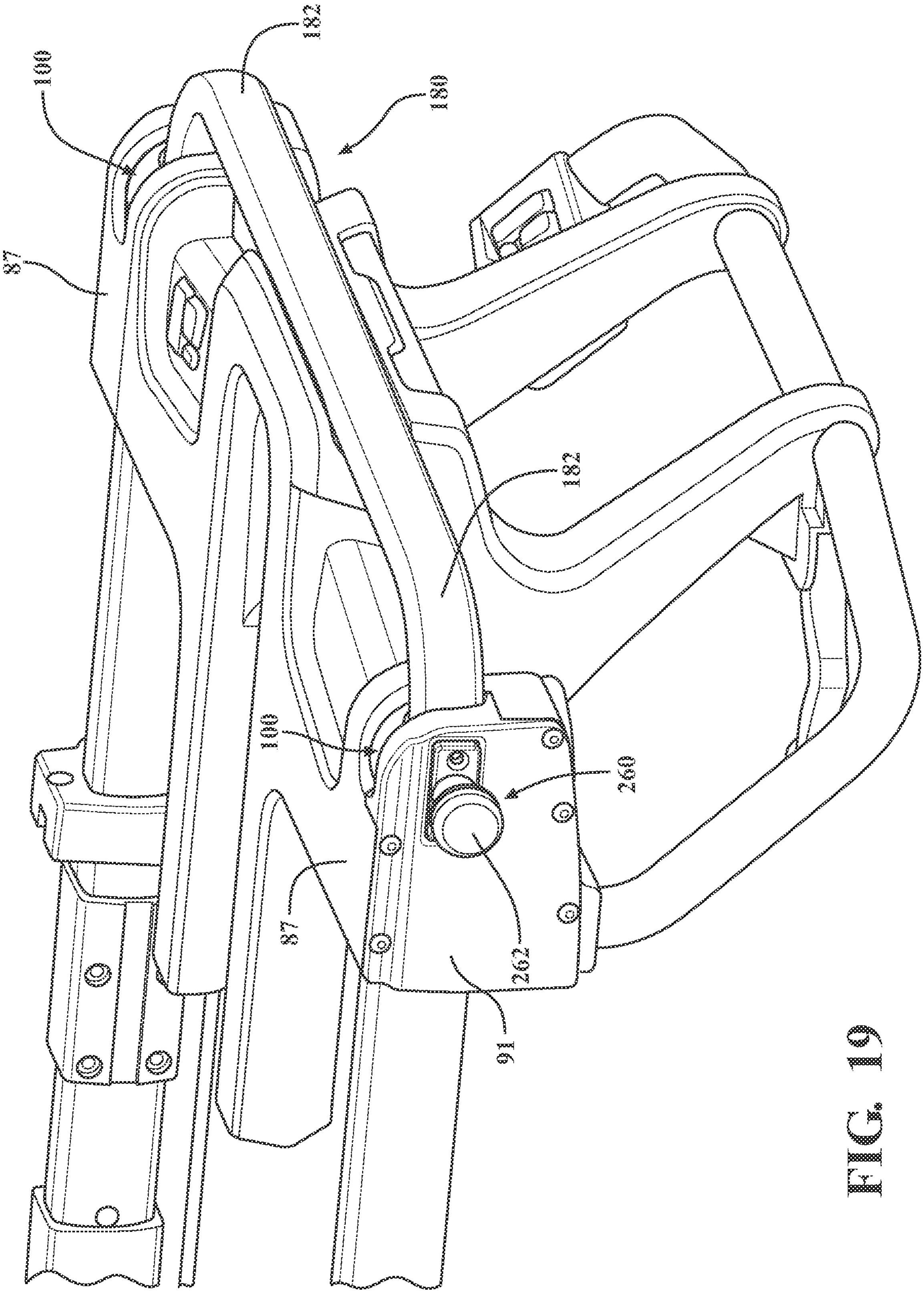
FIG. 19 is a perspective view of the alternative handle assembly in the retracted position.
Figure 20:
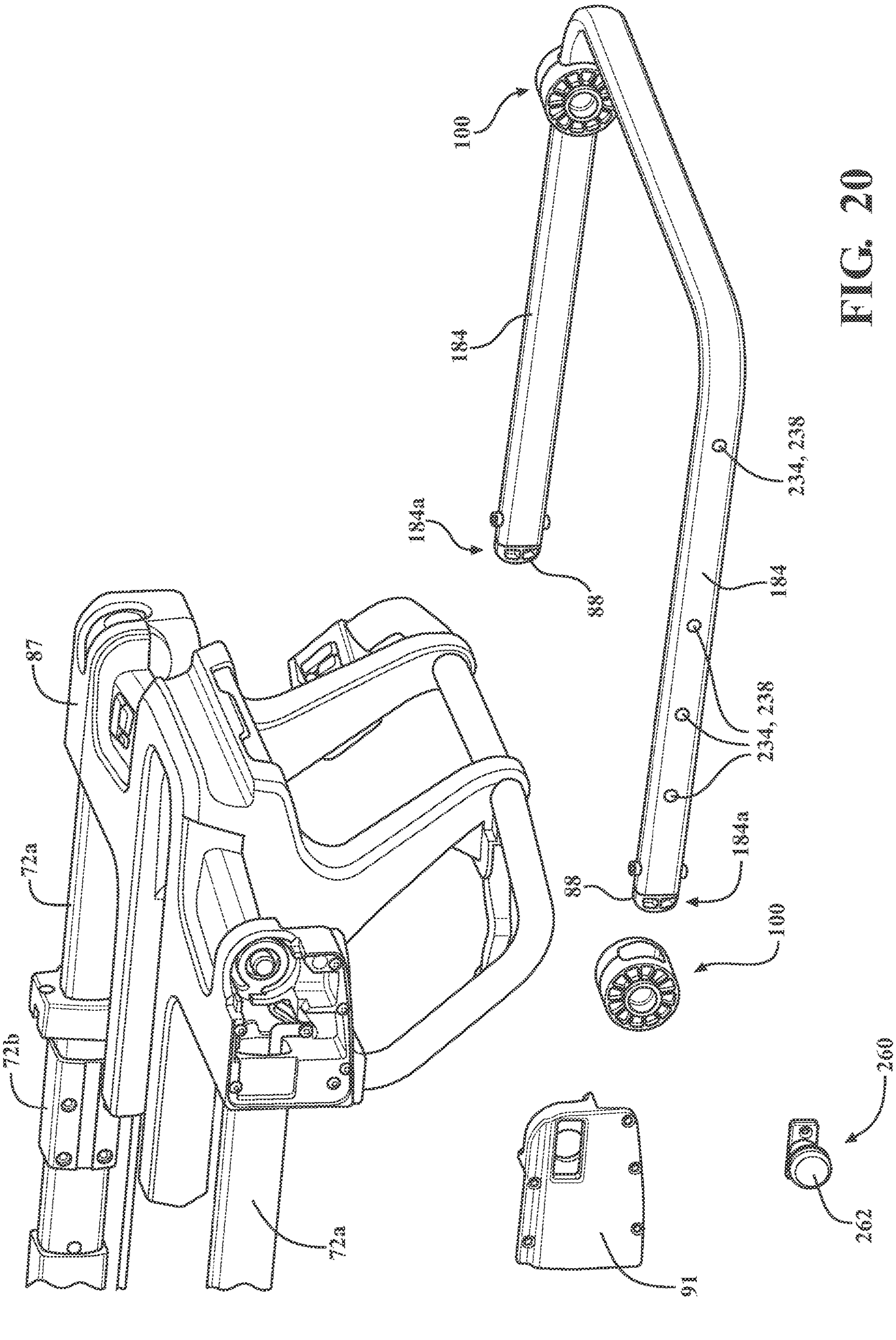
FIG. 20 is a partially exploded view of the alternative handle assembly.

A biasing device 146, such as a compression spring or other resilient member, is located to bias the latch slider 138 toward a locked position by acting between the lock housing 140 and the latch slider 138 (see FIGS. 16A and 16B). The biasing device 146 is shown applying a biasing force against the latch slider 138 in FIG. 16A to maintain the latch slider 138 in the locked position. The biasing device 146 is shown being further compressed in FIG. 16B when the latch slider 138 is being moved to an unlocked position during release, as described further below.

Referring to FIG. 16A, the catches include openings 148 (e.g., slots) and crossbar portions 85*a* of the crossbar 85. The openings 148 are sized and shaped to receive the hooks 136 when the handle assembly 80 is moved to the retracted position. The hooks 136 have lead-in portions 150 and camming portions 152 that are contacted by the crossbar 85 to urge the hooks 136 laterally along the slide axis SA.

During operation, when the user pushes the handle assembly 80 from the extended position toward the retracted position (not shown), the lead-in portions 150 of the hooks 136 are initially longitudinally aligned with the openings 148 while the camming portions 152 are longitudinally aligned with the crossbar portions 85*a*. With continued pushing of the handle assembly 80, the crossbar portions 85*a* contact the camming portions 152. When this occurs, and with continued manual pushing of the handle assembly 80 in the longitudinal direction, the latch slider 138 and the hooks 136 thereof are moved laterally, against the bias of the biasing device 146, until the camming portions 152 pass completely through the openings 148. This camming action is provided by the angled shaped of the camming portions 152, i.e., a longitudinally-applied force causes lateral movement. Once the camming portions 152 pass completely through the openings 148, the hooks 136 are free to slide back laterally until hook portions 154 of the hooks 136 engage the wall of the crossbar 85 to lock the handle assembly 80 in a locked state (as shown in FIG. 16A).

A release device includes a release 160 that is configured to cooperate with the latch assembly to release the first locking elements 132 (e.g., the hooks 136) from the second locking elements 134 (e.g., the openings 148) to allow movement of the handle assembly 80 from the retracted position to the extended position. The release 160 includes one or more manual actuators 162 operatively coupled to the first locking elements 132. The manual actuators 162 are configured to be operated by the user to release the first locking elements 132 from the second locking elements 134. Each of the manual actuators 162 includes an actuator body having a push-actuated plunger 166 (see FIG. 16A). The actuator body is retained in the lock housing 140 to slide longitudinally and is constrained from lateral movement. In other words, the actuator body slides along release axes RA (aligned with the plungers 166) that are arranged generally transverse (e.g., perpendicular) to the slide axis SA.

Biasing devices 168 (e.g., compression springs or other suitable resilient members) are arranged to act between the manual actuators 162 and the lock housing 140 to bias the manual actuators 162 toward their unreleased positions. The lock housing 140 may include protruding tabs 170 that ride in corresponding slots 172 in the actuator bodies to retain the actuator bodies and constrain the plungers 166 to movement along the release axes RA (see FIG. 15B). The cover 142 of the lock housing 140 defines openings 174 also sized and shaped to retain the manual actuators 162 for sliding movement therein and constrain lateral movement.

During operation, as best shown in FIGS. 16A and 16B, when the user presses/pushes one or both of the manual actuators 162 to their released positions (such as with their thumbs), the plungers 166 are urged longitudinally along the release axes RA toward the head end of the patient transport apparatus 30 (see arrows in FIG. 16B). Such user actuation is against the bias of their corresponding biasing devices 168 (see biasing devices 168 schematically shown in phantom in FIGS. 16A and 16B). When actuated, the plungers 166 cooperate with camming surfaces 176 on the latch slider 138 to urge the latch slider 138 laterally (against the bias of its biasing device 146) along the slide axis SA to an unlocked position so that the hook portions 154 are moved out of engagement with the crossbar portions 85*a* and instead align with the openings 148 (see FIG. 16B) to allow the handle assembly 80 to be pulled toward the extended position. Once the manual actuators 162 are released, they spring back to their normal, unreleased positions and the latch slider 138 slides back to its locked position.

Referring to FIGS. 17A-20, an alternative handle assembly 180 is shown. In this version, handles 182 and handle links 184 move in the same manner as previously described with respect to the handle assembly 80. For example, the same caps 88 and carriers 100 may be employed to cooperate with the distal end portions 184*a* of the handle links 184. However, an alternative latch assembly is employed to retain and lock the handle assembly 180 in the retracted position adjacent to the frame 36 and an alternative release device is employed to release the lock 230 and allow the handle assembly 180 to move from the retracted position to the extended position.

Figure 21A:
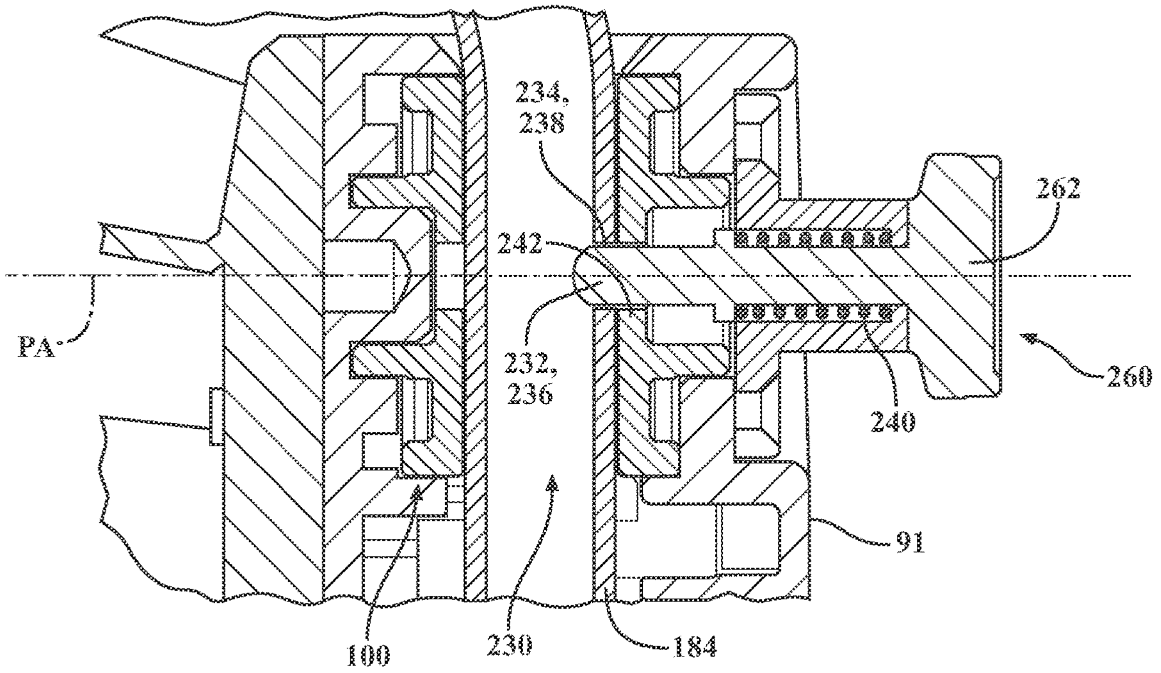
FIGS. 21A and 21B illustrate a latch assembly and a release device for the alternative handle assembly.
Figure 21B:
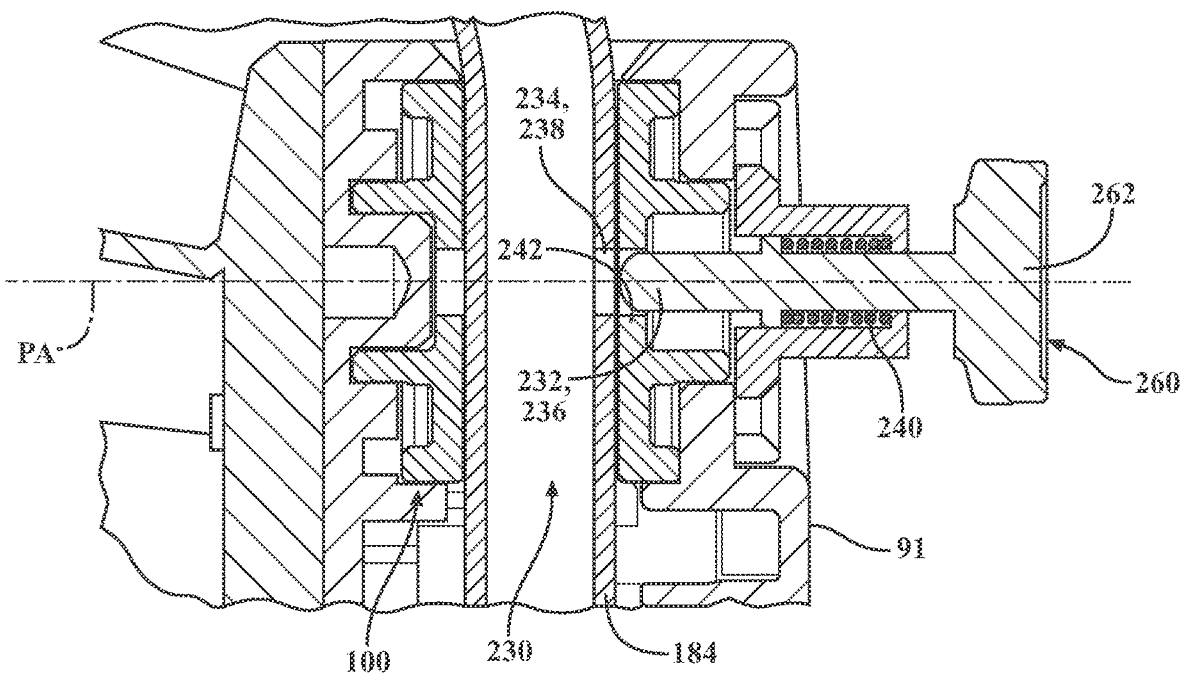

Referring to FIGS. 21A and 21B, in the version shown, the latch assembly includes a lock 230 having a pair of first locking elements 232 (one for each handle link 184) and second locking elements 234. The lock 230 may also include only a single locking element, two locking elements, or any suitable number of locking elements. The first locking elements 232 include latches such as locking pins 236. The second locking elements 234 include catches such as discrete openings 238 that are spaced from each other along the handle links 184.

Biasing devices 240 (e.g., compression springs or other resilient members) are arranged to bias the locking pins 236 toward the handle links 184 so that as each locking pin 236 (one for each handle link 184) aligns with one of the discrete openings 238, the locking pin 236 protrudes into the discrete opening 238 under biasing force of the biasing device 240 to lock the extension/retraction of the handle assembly 180 (see FIG. 21A). There may be one, two, three, or more discrete openings 238 for each of the handle links 184 such that the handle assembly 180 can be locked at the retracted position, the extended position, and/or one or more positions therebetween.

The release device includes a release 260 having a pair of manual actuators 262 (one for each lock 230) that may be simultaneously pulled by the user against the bias of the biasing devices 240 to release the lock 230, e.g., by pulling the locking pins 236 from their corresponding discrete openings 238. In the version shown, each manual actuator 262 is in the form of a knob that can be grasped and pulled by a user to pull the locking pins 236 and allow sliding of the handle links 184. A single manual actuator, or additional manual actuators may also be used in some versions. During operation, as shown in FIG. 21B, the user grasps and pulls the knobs laterally (only one shown) to pull the locking pins 236 until the locking pins 236 fully clear the discrete opening 238 in which they were positioned (see FIG. 21B). In this version, the locking pins 236 are coaxially aligned with the pivot axis PA of the carriers 100. The manual actuators 262 may also be mounted to the outer housings 91 that secure the carriers 100 in place. As shown, each of the carriers 100 defines a through opening 242 into which the locking pin 236 can be withdrawn to its released position (FIG. 21B). In some versions, the manual actuators 262 may be located elsewhere and may not be aligned with the pivot axis PA, and may be utilized to facilitate locking the handle link 84 at various angles between the first orientation (e.g., FIG. 17B) and the second orientation (e.g., FIG. 18B).

Several examples have been discussed in the foregoing description. However, the examples discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

What is claimed is:

1. A patient transport apparatus comprising:

a support structure comprising a base, a support frame, and a litter defining a patient support surface to support a patient; and a handle assembly arranged for engagement by a user, the handle assembly including:

a pair of guides operatively attached to the support structure and spaced laterally from each other, a pair of carriers each supported by a respective one of the pair of guides and rotating relative to the pair of guides about a pivot axis, a pair of links each comprising a shank slidably supported by a respective one of the pair of carriers for movement between:

a retracted position where the shank is arranged at a first angle relative to the litter; and an extended position where the shank is arranged at a second angle relative to the litter, the second angle being different from the first angle.

2. The patient transport apparatus of claim 1, wherein the handle assembly further includes:

a crossbar extending laterally between the pair of links, and one or more grips operatively attached to one or more of the crossbar and the pair of links.

3. The patient transport apparatus of claim 1, wherein the handle assembly further includes a housing operatively attached to the support structure and defining the pair of guides.

4. The patient transport apparatus of claim 3, wherein the housing includes an inner housing and a pair of outer housings; and wherein the pair of guides are spaced laterally from each other between the pair of outer housings.

5. The patient transport apparatus of claim 4, wherein the pair of carriers each comprise a respective cylindrical body aligned with the pivot axis and having a curved outer surface extending between two sides;

and wherein the pair of carriers each include a respective carrier aperture defined in the curved outer surface and arranged transverse to the pivot axis with the carrier apertures each slidably supporting a respective one of the shanks of the pair of links.

6. The patient transport apparatus of claim 1, wherein the pair of carriers each define a respective first pivoting connection;

wherein the pair of guides each define a respective second pivoting connection arranged for pivoting engagement with one of the first pivoting connections of the pair of carriers; and wherein at least one of the first pivoting connections is further defined as a spindle or a bushing.

7. The patient transport apparatus of claim 1, wherein the pair of carriers each define a respective carrier aperture arranged transverse to the pivot axis and having a first portion with a first dimension and a second portion with a second dimension; and wherein the handle assembly further includes a pair of limit members each protruding from a respective one of the shanks and engageable with the first portion of a respective one of the carrier apertures, the pair of limit members each having a profile dimension larger than the second dimension of the second portion of the respective carrier aperture for preventing distal ends of the shanks of the pair of links from being disposed in the second portions of the carrier apertures.

8. The patient transport apparatus of claim 7, wherein the handle assembly further comprises a pair of caps each coupled to a respective one of the distal ends of the shanks of the pair of links; and wherein the pair of limit members are each disposed in a respective one of the pair of caps and are movable relative thereto to change the profile dimension.

9. The patient transport apparatus of claim 8, wherein the pair of caps each include a biasing device arranged to urge a respective one of the pair of limit members toward a greater profile dimension.

10. The patient transport apparatus of claim 8, wherein the handle assembly further comprises a pair of shank brace sets each including:

a first shank brace defining a first socket for receiving a respective one of the shanks in the retracted position, and a second shank brace defining a second socket for receiving the shanks in the extended position.

11. The patient transport apparatus of claim 10, wherein the support structure comprises a pair of longitudinal rails each defining a rail bore;

wherein the shanks of the pair of links are each at least partially disposed in a respective one of the rail bores of the pair of longitudinal rails in the retracted position; and wherein the first sockets of the first shank braces of the pair of shank brace sets are aligned with the rail bores of the pair of longitudinal rails to facilitate movement of the shanks from the retracted position.

12. The patient transport apparatus of claim 11, wherein the shanks of the pair of links are disposed in neither the first socket nor the second socket of the pairs of shank brace sets when the shanks are in the extended position.

13. The patient transport apparatus of claim 10, wherein the first sockets each have a socket dimension approximately equivalent to the first dimension of the first portion of the respective carrier aperture.

14. The patient transport apparatus of claim 10, wherein the shanks of the pair of links are further movable between the extended position and a braced position, wherein the shanks are arranged at the second angle relative to the litter and the pair of caps are each at least partially disposed in a respective one of the second sockets of the pair of shank brace sets.

15. The patient transport apparatus of claim 1, further comprising a latch assembly coupled to the litter and engageable with the handle assembly for limiting movement of the pair of links relative to the litter, wherein the latch assembly is selectively releasable to permit movement of the pair of links.

16. The patient transport apparatus of claim 15, wherein the latch assembly further comprises a first locking element;

wherein the handle assembly comprises a second locking element; and wherein movement of the shanks of the pair of links into the retracted position engages the second locking element with the first locking element.

17. The patient transport apparatus of claim 16, wherein the latch assembly further comprises a manual actuator arranged for manual actuation to release the first locking element from the second locking element to permit movement of the pair of links relative to the litter.

18. The patient transport apparatus of claim 1, wherein the extended position is further defined as a second extended position; and wherein the shanks of the pair of links are slidably supported by the pair of carriers for movement between:

the retracted position, a first extended position where the shank is arranged at the first angle relative to the litter, and the second extended position.

19. The patient transport apparatus of claim 18, wherein the pair of carriers each define a respective carrier aperture arranged transverse to the pivot axis with the carrier apertures each slidably supporting a respective one of the shanks of the pair of links.

20. The patient transport apparatus of claim 19, wherein distal ends of the shanks of the pair of links are spaced from the carrier apertures when the shanks are arranged in the retracted position;

wherein the distal ends of the shanks are at least partially disposed within the carrier apertures when the shanks are arranged in the first extended position; and wherein the distal ends of the shanks are at least partially disposed within the carrier apertures when the shanks are arranged in the second extended position.

* * * * *